(12) United States Patent
Tong et al.

(10) Patent No.: US 12,220,294 B2
(45) Date of Patent: Feb. 11, 2025

(54) INDIRECT BONDING TRAYS, NON-SLIDING ORTHODONTIC APPLIANCES, AND REGISTRATION SYSTEMS FOR USE THEREOF

(71) Applicant: Swift Health Systems Inc., Irvine, CA (US)

(72) Inventors: Hongsheng Tong, Yorba Linda, CA (US); Philong John Pham, Huntington Beach, CA (US); Allen Huynh, Irvine, CA (US); Robert Lee, Torrance, CA (US); Vijay Dhaka, Irvine, CA (US)

(73) Assignee: Swift Health Systems Inc., Irvine, CA (US)

( * ) Notice: Subject to any disclaimer, the term of this patent is extended or adjusted under 35 U.S.C. 154(b) by 0 days.

(21) Appl. No.: 18/337,348

(22) Filed: Jun. 19, 2023

(65) Prior Publication Data

US 2024/0058101 A1  Feb. 22, 2024

Related U.S. Application Data

(63) Continuation of application No. 17/303,799, filed on Jun. 8, 2021, now abandoned, which is a continuation
(Continued)

(51) Int. Cl.
*A61C 7/14* (2006.01)
*A61C 7/00* (2006.01)
(Continued)

(52) U.S. Cl.
CPC .............. *A61C 7/146* (2013.01); *A61C 7/002* (2013.01); *A61C 7/02* (2013.01); *A61C 7/22* (2013.01);
(Continued)

(58) Field of Classification Search
CPC .. A61C 7/146; A61C 7/02; A61C 7/28; A61C 7/002; A61C 7/22; A61C 9/004; A61C 2201/002
(Continued)

(56) References Cited

U.S. PATENT DOCUMENTS 1,005,131 A  10/1911  Angle et al.
1,108,493 A  8/1914  Federspiel
(Continued)

FOREIGN PATENT DOCUMENTS

CN  1372872  10/2002
CN  201079455  7/2008
(Continued)

OTHER PUBLICATIONS

Coro, Jorge C. et al., "MEAW Therapy" MEAW Therapy-Orthodontic Products, accessed via http://www.orthodonticproductsonline.com/2012/11/meaw-therapy/ on Mar. 14, 2016, published Nov. 12, 2012 in 6 pages.
(Continued)

*Primary Examiner* — Matthew M Nelson
(74) *Attorney, Agent, or Firm* — Knobbe, Martens, Olson & Bear, LLP

(57) ABSTRACT

Non-sliding orthodontic appliances may include an archwire having male fasteners for locking in place with brackets in a non-sliding manner and interproximal loops for exerting forces on the brackets. Appropriate forces may be calculated according to vectors between initial and ideal tooth positions. The brackets may be transferred to a patient's teeth using indirect bonding trays which contain slots for holding and aligning each bracket. The trays may include integrated handles for facilitating handling, may be sectioned into smaller pieces for easier application, and/or may be labeled for facilitating proper registration. Superposition of a digital
(Continued)

placement plan and clinical model after bonding may illustrate the accuracy of bracket placement. The archwire may comprise atraumatic ends to avoid patient discomfort. A color registration system can be used to facilitate the attachment of the archwire to the brackets. The archwire may be locked into place with the brackets using crimpable stops.

19 Claims, 10 Drawing Sheets

Related U.S. Application Data of application No. 15/957,760, filed on Apr. 19, 2018, now Pat. No. 11,058,517.

(60) Provisional application No. 62/488,656, filed on Apr. 21, 2017.

(51) Int. Cl.
  *A61C 7/02* (2006.01)
  *A61C 7/22* (2006.01)
  *A61C 7/28* (2006.01)
  *A61C 9/00* (2006.01)

(52) U.S. Cl.
  CPC ............... *A61C 7/28* (2013.01); *A61C 9/004* (2013.01); *A61C 2201/002* (2013.01)

(58) Field of Classification Search
  USPC .............................................................. 433/3
  See application file for complete search history.

(56) References Cited

U.S. PATENT DOCUMENTS

| | | |
|---|---|---|
| 1,307,382 A | 6/1919 | Stanton |
| 1,323,141 A | 11/1919 | Young |
| 1,429,749 A | 9/1922 | Maeulen et al. |
| 1,638,006 A | 2/1926 | Aderer |
| 2,257,069 A | 9/1941 | Peak |
| 2,495,692 A | 1/1950 | Brusse |
| 2,524,763 A | 10/1950 | Brusse |
| 2,582,230 A | 1/1952 | Brusse |
| 3,256,602 A | 6/1966 | Broussard |
| 3,262,207 A | 7/1966 | Kesling |
| 3,374,542 A | 3/1968 | Moylan, Jr. |
| 3,464,113 A | 9/1969 | Silverman et al. |
| 3,593,421 A | 7/1971 | Brader |
| 3,600,808 A | 8/1971 | Reeve |
| 3,683,502 A | 8/1972 | Wallshein |
| 3,691,635 A | 9/1972 | Wallshein |
| 3,762,050 A | 10/1973 | Dal Pont |
| 3,765,091 A | 10/1973 | Northcutt |
| 3,878,610 A | 4/1975 | Coscina |
| 3,936,938 A | 2/1976 | Northcutt |
| 3,946,488 A | 3/1976 | Miller et al. |
| 3,949,477 A | 4/1976 | Cohen et al. |
| 3,975,823 A | 8/1976 | Sosnay |
| 4,103,423 A | 8/1978 | Kessel |
| 4,171,568 A | 10/1979 | Forster |
| 4,192,070 A | 3/1980 | Lemchen et al. |
| 4,193,195 A | 3/1980 | Merkel et al. |
| 4,197,643 A | 4/1980 | Burstone et al. |
| 4,268,250 A | 5/1981 | Reeve |
| 4,330,273 A | 5/1982 | Kesling |
| 4,354,833 A | 10/1982 | Fujita |
| 4,354,834 A | 10/1982 | Wilson |
| 4,382,781 A | 5/1983 | Grossman |
| 4,385,890 A | 5/1983 | Klein |
| 4,412,819 A | 11/1983 | Cannon |
| 4,424,033 A | 1/1984 | Wool |
| 4,436,510 A | 3/1984 | Klein |
| 4,479,779 A | 10/1984 | Wool |
| 4,483,674 A | 11/1984 | Schütz |
| 4,490,112 A | 12/1984 | Tanaka et al. |
| 4,501,554 A | 2/1985 | Hickham |
| 4,516,938 A | 5/1985 | Hall |
| 4,533,320 A | 8/1985 | Piekarsky |
| 4,561,844 A | 12/1985 | Bates |
| 4,580,976 A | 4/1986 | O'Meara |
| 4,582,487 A | 4/1986 | Creekmore |
| 4,585,414 A | 4/1986 | Kottermann |
| 4,592,725 A | 6/1986 | Goshgarian |
| 4,634,662 A | 1/1987 | Rosenberg |
| 4,656,860 A | 4/1987 | Orthuber et al. |
| 4,659,310 A | 4/1987 | Kottermann |
| 4,664,626 A | 5/1987 | Kesling |
| 4,674,978 A | 6/1987 | Acevedo |
| 4,676,747 A | 6/1987 | Kesling |
| 4,725,229 A | 2/1988 | Miller |
| 4,797,093 A | 1/1989 | Bergersen |
| 4,797,095 A | 1/1989 | Armstrong et al. |
| 4,838,787 A | 6/1989 | Lerner |
| 4,842,514 A | 6/1989 | Kesling |
| 4,872,449 A | 10/1989 | Beeuwkes |
| 4,881,896 A | 11/1989 | Bergersen |
| 4,892,479 A | 1/1990 | McKenna |
| 4,897,035 A | 1/1990 | Green |
| 4,900,251 A | 2/1990 | Andreasen |
| 4,978,323 A | 12/1990 | Freedman |
| 5,011,405 A | 4/1991 | Lemchen |
| 5,017,133 A | 5/1991 | Miura |
| 5,044,947 A | 9/1991 | Sachdeva et al. |
| 5,055,039 A | 10/1991 | Abbatte et al. |
| 5,092,768 A | 3/1992 | Korn |
| 5,114,339 A | 5/1992 | Guis |
| 5,123,838 A | 6/1992 | Cannon |
| 5,127,828 A | 7/1992 | Suyama |
| 5,131,843 A | 7/1992 | Hilgers et al. |
| 5,154,606 A | 10/1992 | Wildman |
| 5,174,754 A | 12/1992 | Meritt |
| 5,176,514 A | 1/1993 | Viazis |
| 5,176,618 A | 1/1993 | Freedman |
| 5,238,404 A | 8/1993 | Andreiko |
| 5,242,304 A | 9/1993 | Truax et al. |
| 5,248,257 A | 9/1993 | Cannon |
| 5,259,760 A | 11/1993 | Orikasa |
| 5,312,247 A | 5/1994 | Sachdeva et al. |
| 5,344,315 A | 9/1994 | Hanson |
| 5,368,478 A | 11/1994 | Andreiko |
| 5,380,197 A | 1/1995 | Hanson |
| 5,399,087 A | 3/1995 | Arndt |
| 5,431,562 A | 7/1995 | Andreiko |
| 5,447,432 A | 9/1995 | Andreiko |
| 5,454,717 A | 10/1995 | Andreiko |
| RE35,169 E | 3/1996 | Lemchen et al. |
| 5,516,284 A | 5/1996 | Wildman |
| 5,556,277 A | 9/1996 | Yawata et al. |
| 5,624,258 A | 4/1997 | Wool |
| 5,630,715 A | 5/1997 | Voudouris |
| 5,683,243 A | 11/1997 | Andreiko |
| 5,683,245 A | 11/1997 | Sachdeva et al. |
| 5,722,827 A | 3/1998 | Allesee |
| 5,727,941 A | 3/1998 | Kesling |
| 5,816,800 A | 10/1998 | Brehm |
| 5,820,370 A | 10/1998 | Brosius |
| 5,863,198 A | 1/1999 | Doyle |
| 5,890,893 A | 4/1999 | Heiser |
| 5,971,754 A | 10/1999 | Sondhi et al. |
| 5,975,893 A | 11/1999 | Chishti et al. |
| 5,993,208 A | 11/1999 | Jonjic |
| 6,015,289 A | 1/2000 | Andreiko |
| 6,036,489 A | 3/2000 | Brosius |
| 6,042,374 A | 3/2000 | Farzin-Nia et al. |
| 6,086,364 A | 7/2000 | Brunson |
| 6,089,861 A | 7/2000 | Kelly |
| 6,095,809 A | 8/2000 | Kelly et al. |
| 6,099,304 A | 8/2000 | Carter |
| 6,123,544 A * | 9/2000 | Cleary .................. A61C 7/146 433/74 |
| 6,183,250 B1 | 2/2001 | Kanno et al. |
| 6,190,166 B1 | 2/2001 | Sasakura |
| 6,196,839 B1 | 3/2001 | Ross |

(56) References Cited

U.S. PATENT DOCUMENTS

| | | |
|---|---|---|
| 6,213,767 B1 | 4/2001 | Dixon et al. |
| 6,217,325 B1 | 4/2001 | Chishti et al. |
| 6,227,850 B1 | 5/2001 | Chishti et al. |
| 6,244,861 B1 | 6/2001 | Andreiko |
| 6,250,918 B1 | 6/2001 | Sachdeva et al. |
| 6,258,118 B1 | 7/2001 | Baum et al. |
| 6,315,553 B1 | 11/2001 | Sachdeva et al. |
| 6,318,994 B1 | 11/2001 | Chishti et al. |
| 6,318,995 B1 | 11/2001 | Sachdeva et al. |
| 6,334,853 B1 | 1/2002 | Kopelman et al. |
| 6,350,120 B1 | 2/2002 | Sachdeva et al. |
| 6,358,045 B1 | 3/2002 | Farzin-Nia et al. |
| 6,371,761 B1 | 4/2002 | Cheang et al. |
| 6,375,458 B1 | 4/2002 | Moorleghem et al. |
| 6,394,801 B2 | 5/2002 | Chishti et al. |
| 6,398,548 B1 | 6/2002 | Muhammad et al. |
| 6,413,084 B1 | 6/2002 | Rubbert et al. |
| 6,431,870 B1 | 8/2002 | Sachdeva |
| 6,450,807 B1 | 9/2002 | Chishti et al. |
| 6,464,495 B1 | 10/2002 | Voudouris |
| 6,464,496 B1 | 10/2002 | Sachdeva et al. |
| 6,471,511 B1 | 10/2002 | Chishti et al. |
| 6,471,512 B1 | 10/2002 | Sachdeva et al. |
| 6,512,994 B1 | 1/2003 | Sachdeva |
| 6,514,074 B1 | 2/2003 | Chishti et al. |
| 6,532,299 B1 | 3/2003 | Sachdeva et al. |
| 6,540,512 B1 | 4/2003 | Sachdeva et al. |
| 6,554,613 B1 | 4/2003 | Sachdeva et al. |
| 6,572,693 B1 | 6/2003 | Wu et al. |
| 6,582,226 B2 | 6/2003 | Jordan et al. |
| 6,587,828 B1 | 7/2003 | Sachdeva |
| 6,595,774 B1 | 7/2003 | Risse |
| 6,554,611 B2 | 8/2003 | Chishti et al. |
| 6,602,070 B2 | 8/2003 | Miller et al. |
| 6,612,143 B1 | 9/2003 | Butscher et al. |
| 6,616,444 B2 | 9/2003 | Andreiko |
| 6,626,666 B2 | 9/2003 | Chishti et al. |
| 6,629,840 B2 | 10/2003 | Chishti et al. |
| 6,632,089 B2 | 10/2003 | Rubbert |
| 6,648,640 B2 | 11/2003 | Rubbert |
| 6,663,385 B2 | 12/2003 | Tepper |
| 6,679,700 B2 | 1/2004 | McGann |
| 6,682,344 B1 | 1/2004 | Stockstill |
| 6,685,469 B2 | 2/2004 | Chishti et al. |
| 6,685,470 B2 | 2/2004 | Chishti et al. |
| 6,688,885 B1 | 2/2004 | Sachdeva et al. |
| 6,699,037 B2 | 3/2004 | Chishti et al. |
| 6,702,575 B2 | 3/2004 | Hilliard |
| 6,705,863 B2 | 3/2004 | Phan et al. |
| 6,722,878 B2 | 4/2004 | Graham |
| 6,722,880 B2 | 4/2004 | Chishti et al. |
| 6,728,423 B1 | 4/2004 | Rubbert et al. |
| 6,729,876 B2 | 5/2004 | Chishti et al. |
| 6,732,558 B2 | 5/2004 | Butscher et al. |
| 6,733,285 B2 | 5/2004 | Puttler et al. |
| 6,733,287 B2 | 5/2004 | Wilkerson |
| 6,733,288 B2 | 5/2004 | Vallittu et al. |
| 6,736,638 B1 | 5/2004 | Sachdeva et al. |
| 6,738,508 B1 | 5/2004 | Rubbert et al. |
| 6,739,869 B1 | 5/2004 | Taub et al. |
| 6,744,914 B1 | 6/2004 | Rubbert et al. |
| 6,744,932 B1 | 6/2004 | Rubbert et al. |
| 6,746,241 B2 | 6/2004 | Townsend-Hansen |
| 6,755,064 B2 | 6/2004 | Butscher |
| 6,771,809 B1 | 8/2004 | Rubbert et al. |
| 6,776,614 B2 | 8/2004 | Wiechmann |
| 6,811,397 B2 | 11/2004 | Wool |
| 6,830,450 B2 | 12/2004 | Knopp et al. |
| 6,845,175 B2 | 1/2005 | Kopelman et al. |
| 6,846,179 B2 | 1/2005 | Chapouland |
| 6,851,949 B1 | 2/2005 | Sachdeva et al. |
| 6,860,132 B2 | 3/2005 | Butscher |
| 6,893,257 B2 | 5/2005 | Kelly |
| 6,928,733 B2 | 8/2005 | Rubbert et al. |
| 6,948,931 B2 | 9/2005 | Chishti et al. |
| 6,960,079 B2 | 11/2005 | Brennan et al. |
| 6,971,873 B2 | 12/2005 | Sachdeva |
| 6,976,627 B1 | 12/2005 | Culp et al. |
| 6,988,889 B2 | 1/2006 | Abels |
| 6,996,452 B2 | 2/2006 | Erichsen et al. |
| 7,008,221 B2 | 3/2006 | McGann |
| 7,013,191 B2 | 3/2006 | Rubbert |
| 7,020,963 B2 | 4/2006 | Cleary et al. |
| 7,029,275 B2 | 4/2006 | Rubbert |
| 7,033,171 B2 | 4/2006 | Wilkerson |
| 7,037,107 B2 | 5/2006 | Yamamoto |
| 7,056,115 B2 | 6/2006 | Phan et al. |
| 7,063,531 B2 | 6/2006 | Maijer et al. |
| 7,068,836 B1 | 6/2006 | Rubbert et al. |
| 7,076,980 B2 | 7/2006 | Butscher |
| 7,077,646 B2 | 7/2006 | Hilliard |
| 7,077,647 B2 | 7/2006 | Choi et al. |
| 7,080,979 B2 | 7/2006 | Rubbert et al. |
| 7,092,107 B2 | 8/2006 | Babayoff et al. |
| 7,094,053 B2 | 8/2006 | Andreiko |
| 7,112,065 B2 | 9/2006 | Kopelman et al. |
| 7,125,248 B2 | 10/2006 | Phan et al. |
| 7,134,874 B2 | 11/2006 | Chishti et al. |
| 7,137,812 B2 | 11/2006 | Cleary et al. |
| 7,155,373 B2 | 12/2006 | Jordan et al. |
| 7,156,661 B2 | 1/2007 | Choi et al. |
| 7,160,110 B2 | 1/2007 | Imgrund et al. |
| 7,168,950 B2 | 1/2007 | Cinader, Jr. et al. |
| 7,172,417 B2 | 2/2007 | Sporbert et al. |
| 7,175,428 B2 | 2/2007 | Nicholson |
| 7,186,115 B2 | 3/2007 | Goldberg et al. |
| 7,188,421 B2 | 3/2007 | Cleary et al. |
| 7,201,574 B1 | 4/2007 | Wiley |
| 7,204,690 B2 | 4/2007 | Hanson et al. |
| 7,214,056 B2 | 5/2007 | Stockstill |
| 7,229,282 B2 | 6/2007 | Andreiko |
| 7,234,934 B2 | 6/2007 | Rosenberg |
| 7,234,936 B2 | 6/2007 | Lai |
| 7,234,937 B2 | 6/2007 | Sachdeva et al. |
| 7,240,528 B2 | 7/2007 | Weise et al. |
| 7,244,121 B2 | 7/2007 | Brosius |
| 7,245,977 B1 | 7/2007 | Simkins |
| 7,252,506 B2 | 8/2007 | Lai |
| 7,267,545 B2 | 9/2007 | Oda |
| 7,283,891 B2 | 10/2007 | Butscher |
| 7,296,996 B2 | 11/2007 | Sachdeva |
| 7,335,021 B2 | 2/2008 | Nikodem |
| 7,347,688 B2 | 3/2008 | Kopelman et al. |
| 7,354,268 B2 | 4/2008 | Raby et al. |
| 7,357,634 B2 | 4/2008 | Knopp |
| 7,361,017 B2 | 4/2008 | Sachdeva |
| 7,364,428 B2 | 4/2008 | Cinader, Jr. et al. |
| 7,404,714 B2 * | 7/2008 | Cleary .................. A61C 7/146 29/896.11 |
| 7,410,357 B2 | 8/2008 | Cleary et al. |
| 7,416,408 B2 | 8/2008 | Farzin-Nia et al. |
| 7,442,041 B2 | 10/2008 | Imgrund et al. |
| 7,452,205 B2 | 11/2008 | Cinader, Jr. et al. |
| 7,458,812 B2 | 12/2008 | Sporbert et al. |
| 7,469,783 B2 | 12/2008 | Rose, Sr. |
| 7,471,821 B2 | 12/2008 | Rubbert et al. |
| 7,473,097 B2 | 1/2009 | Raby et al. |
| 7,556,496 B2 | 7/2009 | Cinader, Jr. et al. |
| 7,578,673 B2 | 8/2009 | Wen et al. |
| 7,578,674 B2 | 8/2009 | Chishti et al. |
| 7,585,172 B2 | 9/2009 | Rubbert |
| 7,590,462 B2 | 9/2009 | Rubbert |
| 7,604,181 B2 | 10/2009 | Culp et al. |
| 7,621,743 B2 | 11/2009 | Bathen |
| 7,641,473 B2 | 1/2010 | Sporbert |
| 7,674,110 B2 | 3/2010 | Oda |
| 7,677,887 B2 | 3/2010 | Nicholson |
| 7,699,606 B2 | 4/2010 | Sachdeva et al. |
| 7,704,072 B2 | 4/2010 | Damon |
| 7,717,708 B2 | 5/2010 | Sachdeva |
| 7,722,354 B1 | 5/2010 | Dumas |
| 7,726,470 B2 | 6/2010 | Cinader, Jr. et al. |
| 7,726,968 B2 | 6/2010 | Raby et al. |
| 7,751,925 B2 | 7/2010 | Rubbert |

(56) References Cited

U.S. PATENT DOCUMENTS

| | | |
|---|---|---|
| 7,762,815 B2 | 7/2010 | Cinader, Jr. et al. |
| 7,811,087 B2 | 10/2010 | Wiechmann |
| 7,837,464 B2 | 11/2010 | Marshall |
| 7,837,466 B2 | 11/2010 | Griffith et al. |
| 7,837,467 B2 | 11/2010 | Butscher |
| 7,845,938 B2 | 12/2010 | Kim et al. |
| 7,850,451 B2 | 12/2010 | Wiechmann |
| 7,871,267 B2 | 1/2011 | Griffith et al. |
| 7,878,806 B2 | 2/2011 | Lemchen |
| 7,909,603 B2 | 3/2011 | Oda |
| D636,084 S | 4/2011 | Troester |
| D636,085 S | 4/2011 | Troester |
| 7,950,131 B2 | 5/2011 | Hilliard |
| 7,993,133 B2 | 8/2011 | Cinader, Jr. et al. |
| 8,021,146 B2 | 9/2011 | Cinader, Jr. et al. |
| 8,029,275 B2 | 10/2011 | Kesling |
| 8,033,824 B2 | 10/2011 | Oda et al. |
| 8,038,444 B2 | 10/2011 | Kitching et al. |
| 8,047,034 B2 | 11/2011 | Butscher |
| 8,057,226 B2 | 11/2011 | Wiechmann |
| 8,070,487 B2 | 12/2011 | Chishti et al. |
| 8,082,769 B2 | 12/2011 | Butscher et al. |
| 8,092,215 B2 | 1/2012 | Stone-Collonge et al. |
| 8,102,538 B2 | 1/2012 | Babayoff |
| 8,113,828 B1 | 2/2012 | Greenfield |
| 8,113,829 B2 | 2/2012 | Sachdeva |
| 8,114,327 B2 | 2/2012 | Cinader, Jr. et al. |
| 8,121,718 B2 | 2/2012 | Rubbert et al. |
| 8,142,187 B2 | 3/2012 | Sporbert |
| 8,152,519 B1 | 4/2012 | Dumas et al. |
| 8,177,551 B2 | 5/2012 | Sachdeva et al. |
| 8,192,196 B2 | 6/2012 | Singh |
| 8,192,197 B2 | 6/2012 | Sporbert |
| 8,194,067 B2 | 6/2012 | Raby |
| 8,220,195 B2 | 7/2012 | Maijer et al. |
| 8,251,699 B2 | 8/2012 | Reising et al. |
| 8,266,940 B2 | 9/2012 | Riemeir et al. |
| 8,297,970 B2 | 10/2012 | Kanomi |
| 8,308,478 B2 | 11/2012 | Primus et al. |
| 8,313,327 B1 | 11/2012 | Won |
| 8,359,115 B2 | 1/2013 | Kopelman et al. |
| 8,363,228 B2 | 1/2013 | Babayoff |
| 8,366,440 B2 | 2/2013 | Bathen |
| 8,376,739 B2 | 2/2013 | Dupray |
| 8,382,917 B2 | 2/2013 | Johnson |
| 8,393,896 B2 | 3/2013 | Oda |
| 8,417,366 B2 | 4/2013 | Getto et al. |
| 8,439,671 B2 | 5/2013 | Cinader, Jr. |
| 8,439,672 B2 | 5/2013 | Matov et al. |
| 8,451,456 B2 | 5/2013 | Babayoff |
| 8,454,364 B2 | 6/2013 | Taub et al. |
| 8,459,988 B2 | 6/2013 | Dumas |
| 8,465,279 B2 | 6/2013 | Bathen |
| 8,469,704 B2 | 6/2013 | Oda et al. |
| 8,479,393 B2 | 7/2013 | Abels et al. |
| 8,485,816 B2 | 7/2013 | Macchi |
| 8,491,306 B2 | 7/2013 | Raby et al. |
| D688,803 S | 8/2013 | Gilbert |
| 8,500,445 B2 | 8/2013 | Borri |
| 8,517,727 B2 | 8/2013 | Raby et al. |
| 8,545,221 B2 | 10/2013 | Sonte-collenge et al. |
| 8,550,814 B1 | 10/2013 | Collins |
| 8,562,337 B2 | 10/2013 | Kuo et al. |
| 8,573,972 B2 | 11/2013 | Matov et al. |
| 8,591,225 B2 | 11/2013 | Wu et al. |
| 8,591,226 B2 | 11/2013 | Griffith et al. |
| 8,636,505 B2 | 1/2014 | Fornoff |
| 8,638,447 B2 | 1/2014 | Babayoff et al. |
| 8,638,448 B2 | 1/2014 | Babayoff et al. |
| 8,675,207 B2 | 3/2014 | Babayoff |
| 8,678,818 B2 | 3/2014 | Dupray |
| 8,690,568 B2 | 4/2014 | Chapouland |
| 8,708,697 B2 | 4/2014 | Li et al. |
| 8,714,972 B2 | 5/2014 | Eichenberg |
| 8,734,149 B2 | 5/2014 | Phan et al. |
| 8,734,690 B2 | 5/2014 | Komori |
| 8,780,106 B2 | 7/2014 | Chishti et al. |
| 8,805,048 B2 | 8/2014 | Batesole |
| 8,805,563 B2 | 8/2014 | Kopelman et al. |
| 8,807,995 B2 | 8/2014 | Kabbani et al. |
| 8,827,697 B2 | 9/2014 | Cinader, Jr. et al. |
| 8,845,330 B2 | 9/2014 | Taub et al. |
| 8,871,132 B2 | 10/2014 | Abels et al. |
| 8,931,171 B2 | 1/2015 | Rosenberg |
| 8,932,054 B1 | 1/2015 | Rosenberg |
| 8,936,464 B2 | 1/2015 | Kopelman |
| 8,961,172 B2 | 2/2015 | Dupray |
| 8,968,365 B2 | 3/2015 | Aschmann et al. |
| 8,979,528 B2 | 3/2015 | Macchi et al. |
| 8,986,004 B2 | 3/2015 | Dumas |
| 8,992,215 B2 | 3/2015 | Chapouland |
| 8,998,608 B2 | 4/2015 | Imgrund et al. |
| 9,022,781 B2 | 5/2015 | Kuo et al. |
| D731,659 S | 6/2015 | Singh |
| 9,066,775 B2 | 6/2015 | Bukhary |
| 9,089,386 B2 | 7/2015 | Hagelganz |
| D736,945 S | 8/2015 | Singh |
| 9,101,433 B2 | 8/2015 | Babayoff |
| 9,119,689 B2 | 9/2015 | Kabbani |
| 9,127,338 B2 | 9/2015 | Johnson |
| 9,144,473 B2 | 9/2015 | Aldo |
| 9,161,823 B2 | 10/2015 | Morton et al. |
| 9,204,942 B2 | 12/2015 | Phan et al. |
| 9,299,192 B2 | 3/2016 | Kopelman |
| 9,301,815 B2 | 4/2016 | Dumas |
| 9,329,675 B2 | 5/2016 | Ojelund et al. |
| 9,339,352 B2 | 5/2016 | Cinader et al. |
| 9,387,055 B2 | 7/2016 | Cinader, Jr. et al. |
| 9,402,695 B2 | 8/2016 | Curiel et al. |
| 9,427,291 B2 | 8/2016 | Khoshnevis et al. |
| 9,427,916 B2 | 8/2016 | Taub et al. |
| 9,433,477 B2 | 9/2016 | Borovinskih et al. |
| 9,439,737 B2 | 9/2016 | Gonzales et al. |
| 9,451,873 B1 | 9/2016 | Kopelman et al. |
| 9,492,246 B2 | 11/2016 | Lin |
| 9,498,302 B1 | 11/2016 | Patel |
| D774,193 S | 12/2016 | Makmel et al. |
| 9,510,757 B2 | 12/2016 | Kopelman et al. |
| 9,517,112 B2 | 12/2016 | Hagelganz et al. |
| 9,529,970 B2 | 12/2016 | Andreiko |
| 9,532,854 B2 | 1/2017 | Cinader et al. |
| 9,539,064 B2 | 1/2017 | Abels et al. |
| 9,554,875 B2 | 1/2017 | Gualano |
| 9,566,132 B2 | 2/2017 | Stone-collonge et al. |
| 9,566,134 B2 | 2/2017 | Hagelganz et al. |
| 9,585,733 B2 | 3/2017 | Voudouris |
| 9,585,734 B2 | 3/2017 | Lai et al. |
| 9,597,165 B2 | 3/2017 | Kopelman |
| 9,610,628 B2 | 4/2017 | Riemeier |
| 9,615,901 B2 | 4/2017 | Babayoff et al. |
| 9,622,834 B2 | 4/2017 | Chapouland |
| 9,622,835 B2 | 4/2017 | See et al. |
| 9,629,551 B2 | 4/2017 | Fisker et al. |
| 9,629,694 B2 | 4/2017 | Chun et al. |
| 9,642,678 B2 | 5/2017 | Kuo |
| 9,675,435 B2 | 6/2017 | Karazivan et al. |
| 9,707,056 B2 | 7/2017 | Machata et al. |
| 9,763,750 B2 | 9/2017 | Kim et al. |
| 9,788,917 B2 | 10/2017 | Mah |
| 9,814,543 B2 | 11/2017 | Huang et al. |
| 9,844,420 B2 | 12/2017 | Cheang |
| 9,848,958 B2 | 12/2017 | Matov et al. |
| 9,867,678 B2 | 1/2018 | Macchi |
| 9,867,680 B2 | 1/2018 | Damon |
| 9,872,741 B2 | 1/2018 | Gualano |
| 9,877,804 B2 | 1/2018 | Chester |
| 9,877,805 B2 | 1/2018 | Abels et al. |
| 9,925,020 B2 | 3/2018 | Jo |
| 9,937,018 B2 | 4/2018 | Martz et al. |
| 9,937,020 B2 | 4/2018 | Choi |
| 9,956,058 B2 | 5/2018 | Kopelman |
| 9,962,244 B2 | 5/2018 | Esbech et al. |
| 9,975,294 B2 | 5/2018 | Taub et al. |
| 9,987,105 B2 | 6/2018 | Dupray |

(56) References Cited

U.S. PATENT DOCUMENTS

| | | |
|---|---|---|
| 10,028,804 B2 | 7/2018 | Schulhof et al. |
| 10,045,834 B2 | 8/2018 | Gualano |
| 10,052,177 B2 | 8/2018 | Andreiko |
| 10,058,400 B2 | 8/2018 | Abels et al. |
| 10,058,401 B2 | 8/2018 | Tan |
| 10,064,706 B2 | 9/2018 | Dickerson |
| 10,070,943 B2 | 9/2018 | Fornoff |
| 10,076,780 B2 | 9/2018 | Riemeier et al. |
| 10,098,709 B1 | 10/2018 | Kitching et al. |
| 10,130,987 B2 | 11/2018 | Riemeier et al. |
| 10,136,966 B2 | 11/2018 | Reybrouck et al. |
| 10,149,738 B2 | 12/2018 | Lee |
| 10,179,035 B2 | 1/2019 | Shivapuja et al. |
| 10,179,036 B2 | 1/2019 | Lee |
| 10,219,877 B2 | 3/2019 | Khoshnevis et al. |
| 10,226,312 B2 | 3/2019 | Khoshnevis et al. |
| 10,238,476 B2 | 3/2019 | Karazivan et al. |
| 10,241,499 B1 | 3/2019 | Griffin |
| 10,278,791 B2 | 5/2019 | Schumacher |
| 10,278,792 B2 | 5/2019 | Wool |
| 10,278,793 B2 | 5/2019 | Gonzalez et al. |
| 10,292,789 B2 | 5/2019 | Martz et al. |
| 10,307,221 B2 | 6/2019 | Cinader, Jr. |
| 10,314,673 B2 | 6/2019 | Schulhof et al. |
| 10,327,867 B2 | 6/2019 | Nikolskiy et al. |
| 10,342,640 B2 | 7/2019 | Cassalia |
| 10,368,961 B2 | 8/2019 | Paehl et al. |
| 10,383,707 B2 | 8/2019 | Roein Peikar et al. |
| D859,663 S | 9/2019 | Cetta et al. |
| 10,413,386 B2 | 9/2019 | Moon et al. |
| 10,426,575 B1 | 10/2019 | Raslambekov |
| 10,456,228 B2 | 10/2019 | Karazivan et al. |
| 10,478,271 B2 | 11/2019 | Patel |
| 10,485,638 B2 | 11/2019 | Salah |
| 10,492,889 B2 | 12/2019 | Kim et al. |
| 10,492,890 B2 | 12/2019 | Cinader, Jr. et al. |
| 10,555,792 B2 | 2/2020 | Kopelman et al. |
| 10,588,717 B2 | 3/2020 | Chun et al. |
| 10,595,966 B2 | 3/2020 | Carrier, Jr. et al. |
| 10,596,717 B2 | 3/2020 | Hashish et al. |
| 10,603,137 B2 | 3/2020 | Alauddin et al. |
| 10,636,522 B2 | 4/2020 | Katzman et al. |
| 10,639,130 B2 | 5/2020 | Blees et al. |
| 10,639,134 B2 | 5/2020 | Shangjani et al. |
| 10,717,208 B1 | 7/2020 | Raslambekov et al. |
| 10,754,325 B1 | 8/2020 | Griffin, III |
| 10,758,323 B2 | 9/2020 | Kopelman |
| 10,772,706 B2 | 9/2020 | Schumacher |
| 10,806,376 B2 | 10/2020 | Lotan et al. |
| 10,809,697 B2 | 10/2020 | Grapsas |
| 10,828,133 B2 | 11/2020 | Tong et al. |
| 10,849,723 B1 | 12/2020 | Yancey et al. |
| 10,869,738 B2 | 12/2020 | Witte et al. |
| 10,881,488 B2 | 1/2021 | Kopelman |
| 10,881,489 B2 | 1/2021 | Tong et al. |
| 10,905,527 B2 | 2/2021 | Roein Peikar et al. |
| 10,932,887 B2 | 3/2021 | Hung |
| 10,935,958 B2 | 3/2021 | Sirovskiy et al. |
| 10,952,820 B2 | 3/2021 | Song et al. |
| 10,980,614 B2 | 4/2021 | Roein Peikar et al. |
| 10,984,549 B2 | 4/2021 | Goncharov et al. |
| 10,993,782 B1 | 5/2021 | Raslambekov |
| 10,993,785 B2 | 5/2021 | Roein Peikar et al. |
| 10,996,813 B2 | 5/2021 | Makarenkova et al. |
| 11,020,205 B2 | 6/2021 | Li et al. |
| 11,045,281 B2 | 6/2021 | Tsai et al. |
| 11,045,295 B2 | 6/2021 | Karazivan et al. |
| 11,058,517 B2 | 7/2021 | Tong et al. |
| 11,058,518 B2 | 7/2021 | Roein Peikar et al. |
| 11,058,520 B2 | 7/2021 | Khoshnevis et al. |
| 11,072,021 B2 | 7/2021 | Riemeier et al. |
| 11,083,411 B2 | 8/2021 | Yancey et al. |
| 11,083,546 B2 | 8/2021 | Cassalia |
| 11,103,330 B2 | 8/2021 | Webber et al. |
| 11,129,696 B2 | 9/2021 | Khoshnevis et al. |
| 11,147,652 B2 | 10/2021 | Mason et al. |
| 11,154,382 B2 | 10/2021 | Kopelman et al. |
| 11,229,505 B2 | 1/2022 | Schumacher et al. |
| 11,234,794 B2 | 2/2022 | Pokotilov et al. |
| 11,304,781 B2 | 4/2022 | Chun et al. |
| 11,317,994 B2 | 5/2022 | Peikar et al. |
| 11,317,995 B2 | 5/2022 | Peikar et al. |
| 11,324,572 B2 | 5/2022 | Peikar et al. |
| 11,331,165 B2 | 5/2022 | Owen |
| 11,337,486 B2 | 5/2022 | Oda et al. |
| 11,357,598 B2 | 6/2022 | Cramer |
| 11,382,720 B2 | 7/2022 | Kopelman et al. |
| 11,413,117 B2 | 8/2022 | Griffin, III et al. |
| 11,419,701 B2 | 8/2022 | Shanjani et al. |
| 11,433,658 B2 | 9/2022 | Friedrich et al. |
| 11,435,142 B2 | 9/2022 | Hauptmann |
| 11,446,117 B2 | 9/2022 | Paehl et al. |
| 11,446,219 B2 | 9/2022 | Kohler et al. |
| 11,464,604 B2 | 10/2022 | Makarenkova et al. |
| 11,471,254 B2 | 10/2022 | Owen |
| 11,471,255 B2 | 10/2022 | Cinader, Jr. et al. |
| 11,478,335 B2 | 10/2022 | Lai et al. |
| 11,478,337 B2 | 10/2022 | Griffin, III et al. |
| 11,490,995 B2 | 11/2022 | Wratten, Jr. et al. |
| 11,500,354 B2 | 11/2022 | Griffin, III et al. |
| 11,504,212 B2 | 11/2022 | Wratten, Jr. et al. |
| 11,510,757 B2 | 11/2022 | Khoshnevis et al. |
| 11,510,758 B2 | 11/2022 | Khoshnevis et al. |
| D972,732 S | 12/2022 | Villanueva |
| 11,517,405 B2 | 12/2022 | Khoshnevis et al. |
| 11,612,458 B1 | 3/2023 | Tong et al. |
| 11,612,459 B2 | 3/2023 | Tong et al. |
| 11,696,816 B2 | 7/2023 | Gardner |
| 11,911,971 B2 | 2/2024 | Tong et al. |
| 2001/0055741 A1 | 12/2001 | Dixon et al. |
| 2002/0006597 A1 | 1/2002 | Andreiko et al. |
| 2002/0010568 A1 | 1/2002 | Rubbert et al. |
| 2002/0081546 A1 | 6/2002 | Tricca et al. |
| 2002/0098460 A1 | 7/2002 | Farzin-Nia |
| 2002/0192617 A1 | 12/2002 | Phan et al. |
| 2003/0049582 A1 | 3/2003 | Abels et al. |
| 2003/0070468 A1 | 4/2003 | Butscher et al. |
| 2003/0180689 A1 | 9/2003 | Arx et al. |
| 2003/0194677 A1 | 10/2003 | Sachdeva et al. |
| 2003/0207224 A1 | 11/2003 | Lotte |
| 2004/0048222 A1 | 3/2004 | Forster et al. |
| 2004/0072120 A1 | 4/2004 | Lauren |
| 2004/0083611 A1 | 5/2004 | Rubbert et al. |
| 2004/0161722 A1 | 8/2004 | Lai et al. |
| 2004/0166459 A1 | 8/2004 | Voudouris |
| 2004/0168752 A1 | 9/2004 | Julien |
| 2004/0199177 A1 | 10/2004 | Kim |
| 2004/0219471 A1 | 11/2004 | Cleary et al. |
| 2005/0043837 A1 | 2/2005 | Rubbert et al. |
| 2005/0074716 A1 | 4/2005 | Cleary et al. |
| 2005/0106529 A1 | 5/2005 | Abolfathi et al. |
| 2005/0181332 A1 | 8/2005 | Sernetz |
| 2005/0191592 A1 | 9/2005 | Farzin-Nia et al. |
| 2005/0233276 A1 | 10/2005 | Kopelman et al. |
| 2005/0244780 A1 | 11/2005 | Abels et al. |
| 2005/0244781 A1 | 11/2005 | Abels et al. |
| 2005/0244790 A1 | 11/2005 | Kuperman |
| 2006/0006092 A1 | 1/2006 | DuBos |
| 2006/0014116 A1 | 1/2006 | Maijer et al. |
| 2006/0068354 A1 | 3/2006 | Jeckel |
| 2006/0127834 A1 | 6/2006 | Szwajkowski et al. |
| 2006/0175209 A1 | 8/2006 | Sabilla et al. |
| 2006/0223021 A1 | 10/2006 | Cinader, Jr. et al. |
| 2006/0223031 A1 | 10/2006 | Cinader, Jr. et al. |
| 2006/0257813 A1 | 11/2006 | Highland |
| 2006/0257821 A1 | 11/2006 | Cinader, Jr. et al. |
| 2007/0015103 A1 | 1/2007 | Sorel |
| 2007/0031773 A1 | 2/2007 | Scuzzo |
| 2007/0031775 A1* | 2/2007 | Andreiko ............... A61C 7/146 433/24 |
| 2007/0087302 A1 | 4/2007 | Reising et al. |
| 2007/0107745 A1 | 5/2007 | Kiyomoto |
| 2007/0111154 A1 | 5/2007 | Sampermans |
| 2007/0118215 A1 | 5/2007 | Moaddeb |

(56) References Cited

U.S. PATENT DOCUMENTS

| | | |
|---|---|---|
| 2007/0134611 A1 | 6/2007 | Nicholson |
| 2007/0134612 A1 | 6/2007 | Contencin |
| 2007/0141525 A1 | 6/2007 | Cinader, Jr. |
| 2007/0154859 A1 | 7/2007 | Hilliard |
| 2007/0172788 A1 | 7/2007 | Hill, II et al. |
| 2007/0190478 A1 | 8/2007 | Goldberg et al. |
| 2007/0231768 A1 | 10/2007 | Hutchinson |
| 2007/0235051 A1 | 10/2007 | Robinson |
| 2007/0287121 A1 | 12/2007 | Cinader et al. |
| 2008/0032250 A1 | 2/2008 | Kopelman et al. |
| 2008/0057460 A1 | 3/2008 | Hicks |
| 2008/0063995 A1 | 3/2008 | Farzin-Nia et al. |
| 2008/0131831 A1 | 6/2008 | Abels et al. |
| 2008/0160475 A1 | 7/2008 | Rojas-Pardini |
| 2008/0199825 A1 | 8/2008 | Jahn |
| 2008/0227049 A1 | 9/2008 | Sevinc |
| 2008/0233528 A1 | 9/2008 | Kim et al. |
| 2008/0233530 A1 | 9/2008 | Cinader |
| 2008/0233531 A1 | 9/2008 | Raby et al. |
| 2008/0248439 A1 | 10/2008 | Griffith et al. |
| 2008/0254403 A1 | 10/2008 | Hilliard |
| 2008/0268398 A1 | 10/2008 | Cantarella |
| 2008/0286711 A1 | 11/2008 | Corcoran et al. |
| 2008/0305450 A1 | 12/2008 | Steen |
| 2009/0004619 A1 | 1/2009 | Oda et al. |
| 2009/0019698 A1 | 1/2009 | Christoff |
| 2009/0042160 A1 | 2/2009 | Ofir |
| 2009/0088838 A1 | 4/2009 | Shaolian et al. |
| 2009/0191502 A1 | 7/2009 | Cao et al. |
| 2009/0197217 A1 | 8/2009 | Butscher et al. |
| 2009/0216322 A1 | 8/2009 | Le et al. |
| 2009/0220907 A1 | 9/2009 | Suyama |
| 2009/0220920 A1 | 9/2009 | Primus et al. |
| 2009/0222075 A1 | 9/2009 | Gordon |
| 2010/0092903 A1 | 4/2010 | Sabilla |
| 2010/0092905 A1 | 4/2010 | Martin |
| 2010/0105000 A1 | 4/2010 | Scommegna et al. |
| 2010/0129765 A1 | 5/2010 | Mohr et al. |
| 2010/0129766 A1 | 5/2010 | Hilgers |
| 2010/0178628 A1 | 7/2010 | Kim |
| 2010/0179789 A1 | 7/2010 | Sachdeva et al. |
| 2010/0193979 A1 | 8/2010 | Goldberg et al. |
| 2010/0241120 A1 | 9/2010 | Bledsoe et al. |
| 2010/0279243 A1* | 11/2010 | Cinader, Jr. ............ A61C 7/146 433/24 |
| 2010/0304321 A1 | 12/2010 | Patel |
| 2011/0008745 A1 | 1/2011 | McQuillan et al. |
| 2011/0027743 A1 | 2/2011 | Cinader, Jr. et al. |
| 2011/0059414 A1 | 3/2011 | Hirsch |
| 2011/0091832 A1 | 4/2011 | Kim et al. |
| 2011/0220612 A1 | 9/2011 | Kim |
| 2011/0250556 A1 | 10/2011 | Heiser |
| 2011/0270583 A1 | 11/2011 | Getto et al. |
| 2011/0287376 A1 | 11/2011 | Walther |
| 2011/0314891 A1 | 12/2011 | Gilbert |
| 2012/0048432 A1 | 3/2012 | Johnson et al. |
| 2012/0129119 A1 | 5/2012 | Oda |
| 2012/0148972 A1 | 6/2012 | Lewis |
| 2012/0208144 A1 | 8/2012 | Chiaramonte |
| 2012/0266419 A1 | 10/2012 | Browne et al. |
| 2012/0315595 A1 | 12/2012 | Beaudoin |
| 2012/0322019 A1 | 12/2012 | Lewis |
| 2013/0065193 A1 | 3/2013 | Curiel et al. |
| 2013/0122443 A1 | 5/2013 | Huang et al. |
| 2013/0177862 A1 | 7/2013 | Johnson |
| 2013/0196281 A1 | 8/2013 | Thornton |
| 2013/0196282 A1 | 8/2013 | Eichelberger et al. |
| 2013/0260329 A1 | 10/2013 | Voudouris |
| 2013/0315595 A1 | 11/2013 | Barr |
| 2014/0154637 A1 | 6/2014 | Hansen et al. |
| 2014/0170586 A1 | 6/2014 | Cantarella |
| 2014/0234794 A1 | 8/2014 | Vu |
| 2014/0255864 A1* | 9/2014 | Machata ............ A61C 7/146 433/3 |
| 2014/0287376 A1 | 9/2014 | Hultgren et al. |
| 2014/0363782 A1 | 12/2014 | Wiechmann et al. |
| 2015/0010879 A1 | 1/2015 | Kurthy |
| 2015/0064641 A1 | 3/2015 | Gardner |
| 2015/0072299 A1 | 3/2015 | Alauddin et al. |
| 2015/0140501 A1 | 5/2015 | Kim |
| 2015/0201943 A1 | 7/2015 | Brooks et al. |
| 2015/0265376 A1 | 9/2015 | Kopelman |
| 2015/0305833 A1 | 10/2015 | Cosse |
| 2015/0313687 A1 | 11/2015 | Blees et al. |
| 2015/0351872 A1 | 12/2015 | Jo |
| 2015/0359610 A1 | 12/2015 | Gonzalez et al. |
| 2015/0366638 A1 | 12/2015 | Kopelman et al. |
| 2016/0074139 A1* | 3/2016 | Machata ............ A61C 7/146 433/3 |
| 2016/0095670 A1 | 4/2016 | Witte et al. |
| 2016/0106522 A1 | 4/2016 | Kim |
| 2016/0135926 A1 | 5/2016 | Djamchidi |
| 2016/0166357 A1 | 6/2016 | Portalupi |
| 2016/0175073 A1 | 6/2016 | Huang |
| 2016/0206403 A1 | 7/2016 | Ouellette et al. |
| 2016/0228214 A1* | 8/2016 | Sachdeva ............ G05B 19/4097 |
| 2016/0242871 A1 | 8/2016 | Morton et al. |
| 2016/0270885 A1 | 9/2016 | Kwon et al. |
| 2016/0278883 A1 | 9/2016 | Fasci et al. |
| 2016/0287354 A1 | 10/2016 | Viecilli et al. |
| 2016/0310239 A1 | 10/2016 | Paehl et al. |
| 2016/0374780 A1* | 12/2016 | Carrillo Gonzalez . A61C 7/146 433/3 |
| 2017/0086948 A1 | 3/2017 | Von Mandach |
| 2017/0105816 A1 | 4/2017 | Ward |
| 2017/0105817 A1 | 4/2017 | Chun et al. |
| 2017/0128169 A1 | 5/2017 | Lai et al. |
| 2017/0135793 A1 | 5/2017 | Webber et al. |
| 2017/0140381 A1 | 5/2017 | Ducrohet et al. |
| 2017/0151037 A1 | 6/2017 | Lee |
| 2017/0156823 A1 | 6/2017 | Roein Peikar et al. |
| 2017/0165032 A1 | 6/2017 | Webber et al. |
| 2017/0165532 A1 | 6/2017 | Khan et al. |
| 2017/0181813 A1 | 6/2017 | Kalkhoran |
| 2017/0196660 A1 | 7/2017 | Lee |
| 2017/0224444 A1 | 8/2017 | Viecilli et al. |
| 2017/0231721 A1 | 8/2017 | Akeel et al. |
| 2017/0246682 A1 | 8/2017 | Duerig |
| 2017/0252140 A1 | 9/2017 | Murphy et al. |
| 2017/0281313 A1 | 10/2017 | Kim |
| 2017/0281314 A1 | 10/2017 | Freimuller |
| 2017/0296253 A1 | 10/2017 | Brandner et al. |
| 2017/0296304 A1 | 10/2017 | Tong et al. |
| 2017/0312052 A1 | 11/2017 | Moss et al. |
| 2017/0318881 A1 | 11/2017 | Fonte et al. |
| 2017/0325911 A1 | 11/2017 | Marshall |
| 2017/0340777 A1 | 11/2017 | Ma et al. |
| 2018/0014915 A1 | 1/2018 | Voudouris |
| 2018/0014916 A1 | 1/2018 | Cinader, Jr. et al. |
| 2018/0021108 A1 | 1/2018 | Cinader, Jr. et al. |
| 2018/0049847 A1 | 2/2018 | Oda et al. |
| 2018/0055605 A1 | 3/2018 | Witte et al. |
| 2018/0071057 A1 | 3/2018 | Rudman |
| 2018/0110589 A1 | 4/2018 | Gao |
| 2018/0132974 A1 | 5/2018 | Rudman |
| 2018/0161121 A1 | 6/2018 | Butler et al. |
| 2018/0161126 A1 | 6/2018 | Marshall et al. |
| 2018/0168788 A1 | 6/2018 | Fernie |
| 2018/0185120 A1 | 7/2018 | Wool |
| 2018/0185121 A1 | 7/2018 | Pitts et al. |
| 2018/0206941 A1 | 7/2018 | Lee |
| 2018/0214250 A1 | 8/2018 | Martz |
| 2018/0235437 A1 | 8/2018 | Ozerov et al. |
| 2018/0243052 A1 | 8/2018 | Lee |
| 2018/0303583 A1* | 10/2018 | Tong .................. A61C 9/004 |
| 2018/0338564 A1 | 11/2018 | Oda et al. |
| 2019/0001396 A1 | 1/2019 | Riemeier et al. |
| 2019/0019187 A1 | 1/2019 | Miller et al. |
| 2019/0053876 A1 | 2/2019 | Sterental et al. |
| 2019/0090988 A1 | 3/2019 | Schumacher et al. |
| 2019/0090989 A1 | 3/2019 | Jo |
| 2019/0125494 A1 | 5/2019 | Li et al. |
| 2019/0142551 A1 | 5/2019 | Dickenson et al. |
| 2019/0159871 A1 | 5/2019 | Chan et al. |

(56) References Cited

U.S. PATENT DOCUMENTS

| | | |
|---|---|---|
| 2019/0163060 A1 | 5/2019 | Skamser et al. |
| 2019/0175304 A1 | 6/2019 | Morton et al. |
| 2019/0231488 A1 | 8/2019 | Dickerson |
| 2019/0247147 A1 | 8/2019 | Grande et al. |
| 2019/0252065 A1 | 8/2019 | Katzman et al. |
| 2019/0262103 A1 | 8/2019 | Cassalia |
| 2019/0276921 A1 | 9/2019 | Duerig et al. |
| 2019/0321136 A1 | 10/2019 | Martz et al. |
| 2019/0321138 A1 | 10/2019 | Roein Peikar et al. |
| 2019/0328487 A1 | 10/2019 | Levin et al. |
| 2019/0328491 A1 | 10/2019 | Hostettler et al. |
| 2019/0343606 A1 | 11/2019 | Wu et al. |
| 2019/0350682 A1 | 11/2019 | Cinader, Jr. et al. |
| 2019/0388189 A1 | 12/2019 | Shivapuja et al. |
| 2020/0000551 A1 | 1/2020 | Li et al. |
| 2020/0066391 A1 | 2/2020 | Sachdeva et al. |
| 2020/0078137 A1 | 3/2020 | Chen et al. |
| 2020/0107911 A1 | 4/2020 | Roein Peikar et al. |
| 2020/0129272 A1 | 4/2020 | Roein Peikar et al. |
| 2020/0138549 A1 | 5/2020 | Chun et al. |
| 2020/0146779 A1 | 5/2020 | Zhang |
| 2020/0146791 A1 | 5/2020 | Schülke et al. |
| 2020/0170757 A1 | 6/2020 | Kopelman et al. |
| 2020/0188063 A1 | 6/2020 | Cinader, Jr. et al. |
| 2020/0197131 A1 | 6/2020 | Matov et al. |
| 2020/0214806 A1 | 7/2020 | Hung |
| 2020/0229903 A1 | 7/2020 | Sandwick |
| 2020/0275996 A1 | 9/2020 | Tong et al. |
| 2020/0281611 A1 | 9/2020 | Kelly et al. |
| 2020/0338706 A1 | 10/2020 | Cunningham et al. |
| 2020/0345455 A1 | 11/2020 | Roein Peikar et al. |
| 2020/0345459 A1 | 11/2020 | Schueller et al. |
| 2020/0345460 A1 | 11/2020 | Roein Peikar et al. |
| 2020/0352765 A1 | 11/2020 | Lin |
| 2020/0360109 A1 | 11/2020 | Gao et al. |
| 2020/0375270 A1 | 12/2020 | Holschuh et al. |
| 2020/0375699 A1 | 12/2020 | Roein Peikar et al. |
| 2020/0390524 A1 | 12/2020 | Roein Peikar et al. |
| 2020/0390535 A1 | 12/2020 | Curtis et al. |
| 2020/0405191 A1 | 12/2020 | Lotan et al. |
| 2020/0405452 A1 | 12/2020 | Song et al. |
| 2021/0007830 A1 | 1/2021 | Roein Peikar et al. |
| 2021/0007832 A1 | 1/2021 | Roein Peikar et al. |
| 2021/0045701 A1 | 2/2021 | Unklesbay et al. |
| 2021/0068928 A1 | 3/2021 | Witte et al. |
| 2021/0077227 A1 | 3/2021 | Griffin, III et al. |
| 2021/0093422 A1 | 4/2021 | Tong et al. |
| 2021/0128275 A1 | 5/2021 | Suh et al. |
| 2021/0134450 A1 | 5/2021 | Katzman et al. |
| 2021/0137644 A1 | 5/2021 | Benarouch et al. |
| 2021/0145547 A1 | 5/2021 | Roein Peikar et al. |
| 2021/0177551 A1 | 6/2021 | Roein Peikar et al. |
| 2021/0186662 A1 | 6/2021 | Roein Peikar et al. |
| 2021/0205049 A1 | 7/2021 | Cinader, Jr. |
| 2021/0212803 A1 | 7/2021 | Tong et al. |
| 2021/0244502 A1 | 8/2021 | Farkash et al. |
| 2021/0244505 A1 | 8/2021 | Tong et al. |
| 2021/0244507 A1 | 8/2021 | Curiel et al. |
| 2021/0251730 A1 | 8/2021 | Curiel et al. |
| 2021/0259808 A1 | 8/2021 | Ben-gal Nguyen et al. |
| 2021/0275286 A1 | 9/2021 | Karazivan et al. |
| 2021/0330430 A1 | 10/2021 | Khoshnevis et al. |
| 2021/0338380 A1 | 11/2021 | Park et al. |
| 2021/0346127 A1 | 11/2021 | Cassalia |
| 2021/0353389 A1 | 11/2021 | Peikar et al. |
| 2021/0369413 A1 | 12/2021 | Li et al. |
| 2021/0378792 A1 | 12/2021 | Akopov et al. |
| 2021/0386523 A1 | 12/2021 | Raby, II et al. |
| 2021/0393375 A1 | 12/2021 | Chekh et al. |
| 2021/0401546 A1 | 12/2021 | Gardner |
| 2021/0401548 A1 | 12/2021 | Oda et al. |
| 2022/0008169 A1 | 1/2022 | Reisman |
| 2022/0023009 A1 | 1/2022 | Tong et al. |
| 2022/0031428 A1 | 2/2022 | Khoshnevis et al. |
| 2022/0039921 A1 | 2/2022 | Kopelman et al. |
| 2022/0039922 A1 | 2/2022 | Yamaguchi |
| 2022/0061964 A1 | 3/2022 | Khoshnevis et al. |
| 2022/0087783 A1 | 3/2022 | Khoshnevis et al. |
| 2022/0133438 A1 | 5/2022 | Wratten, Jr. et al. |
| 2022/0137592 A1 | 5/2022 | Cramer et al. |
| 2022/0168072 A1 | 6/2022 | Tong et al. |
| 2022/0183797 A1 | 6/2022 | Khoshnevis et al. |
| 2022/0226076 A1 | 7/2022 | Roein Peikar et al. |
| 2022/0226077 A1 | 7/2022 | Roein Peikar et al. |
| 2022/0249201 A1 | 8/2022 | Shuman et al. |
| 2022/0257341 A1 | 8/2022 | Somasundaram et al. |
| 2022/0257344 A1 | 8/2022 | Tsai et al. |
| 2022/0287804 A1 | 9/2022 | Oda |
| 2022/0304773 A1 | 9/2022 | Wratten, Jr. et al. |
| 2022/0304774 A1 | 9/2022 | Wratten, Jr. et al. |
| 2022/0314508 A1 | 10/2022 | Subramaniam et al. |
| 2022/0323183 A1 | 10/2022 | Dufour et al. |
| 2022/0338960 A1 | 10/2022 | Reising |
| 2022/0346912 A1 | 11/2022 | Li et al. |
| 2022/0361996 A1 | 11/2022 | Raby et al. |
| 2023/0012364 A1 | 1/2023 | Melka et al. |
| 2023/0070165 A1 | 3/2023 | Tong et al. |
| 2023/0070837 A1 | 3/2023 | Oda |
| 2023/0072074 A1 | 3/2023 | Oda |
| 2023/0100466 A1 | 3/2023 | Huynh et al. |
| 2023/0157790 A1 | 5/2023 | Medvinskaya et al. |
| 2023/0404715 A1 | 12/2023 | Peikar et al. |
| 2023/0414327 A1 | 12/2023 | Peikar et al. |
| 2024/0061966 A1 | 2/2024 | Oda et al. |
| 2024/0090980 A1 | 3/2024 | Tong et al. |
| 2024/0138958 A1 | 5/2024 | Oda et al. |
| 2024/0173105 A1 | 5/2024 | Tong et al. |

FOREIGN PATENT DOCUMENTS

| | | |
|---|---|---|
| CN | 201320224 Y | 10/2009 |
| CN | 102215773 | 10/2011 |
| CN | 202365955 | 8/2012 |
| CN | 202892116 | 4/2013 |
| CN | 203074896 | 7/2013 |
| CN | 103505293 | 1/2014 |
| CN | 203506900 | 4/2014 |
| CN | 104188728 | 12/2014 |
| CN | 204049881 | 12/2014 |
| CN | 205126459 | 4/2016 |
| CN | 105596098 | 5/2016 |
| CN | 105662615 | 6/2016 |
| CN | 205416056 | 8/2016 |
| CN | 205569100 | 9/2016 |
| CN | 106029002 | 10/2016 |
| CN | 106137419 | 11/2016 |
| CN | 105520787 | 12/2017 |
| CN | 108690967 | 10/2018 |
| CN | 109009504 | 12/2018 |
| CN | 110916820 | 2/2020 |
| CN | 110840586 | 2/2022 |
| CN | 114167807 | 3/2022 |
| CN | 117695035 | 3/2024 |
| DE | 3915807 | 11/1990 |
| DE | 20 2018 003 574 U1 | 8/2018 |
| DE | 10 2018 005 769 A1 | 1/2020 |
| DE | 10 2018 133 705 A1 | 7/2020 |
| DE | 10 2015 017 301 | 3/2022 |
| EP | 0 778 008 | 6/1997 |
| EP | 1 139 902 | 10/2001 |
| EP | 1 276 433 | 1/2003 |
| EP | 1 379 193 | 2/2007 |
| EP | 2 076 207 | 7/2009 |
| EP | 1 073 378 | 1/2012 |
| EP | 2 522 298 | 11/2012 |
| EP | 2 617 383 | 7/2013 |
| EP | 3 285 678 | 5/2021 |
| EP | 3 954 320 | 2/2022 |
| EP | 2 726 049 | 8/2022 |
| EP | 3 019 141 | 8/2022 |
| EP | 4 034 077 | 8/2022 |
| EP | 4 035 649 | 8/2022 |
| EP | 4 044 959 | 8/2022 |
| EP | 4 048 196 | 8/2022 |

(56) References Cited

FOREIGN PATENT DOCUMENTS

| | | |
|---|---|---|
| EP | 4065647 A1 | 8/2022 |
| EP | 3 691 559 | 9/2022 |
| EP | 3 823 813 | 9/2022 |
| EP | 3 905 986 | 9/2022 |
| EP | 4 056 144 | 9/2022 |
| ES | 2 315 046 | 4/2010 |
| FR | 2 525 469 | 10/1983 |
| FR | 3 056 393 | 10/2018 |
| JP | 11221235 A | 8/1999 |
| JP | 2001198143 A | 7/2001 |
| JP | 2009205330 A | 9/2009 |
| KR | 100549294 | 2/2006 |
| KR | 100737442 | 7/2007 |
| KR | 100925286 | 11/2009 |
| KR | 101301886 | 8/2013 |
| KR | 101583547 | 1/2016 |
| KR | 101584737 | 1/2016 |
| KR | 101723674 | 4/2017 |
| RU | 133408 U1 | 10/2013 |
| WO | WO 01/80761 | 11/2001 |
| WO | WO 01/85047 | 11/2001 |
| WO | WO 2003/045266 | 6/2003 |
| WO | WO 2005/008441 | 1/2005 |
| WO | WO 2005/094716 | 10/2005 |
| WO | WO 2007/069286 | 6/2007 |
| WO | WO 2008/051774 | 5/2008 |
| WO | WO 2011/034522 | 3/2011 |
| WO | WO 2011/090502 | 7/2011 |
| WO | WO 2011/103669 | 9/2011 |
| WO | WO 2012/089735 | 7/2012 |
| WO | WO 2012/140021 | 10/2012 |
| WO | WO 2013/019398 | 2/2013 |
| WO | WO 2014/070920 | 5/2014 |
| WO | WO 2016/148961 | 9/2016 |
| WO | WO 2016/149008 | 9/2016 |
| WO | WO 2016/199972 | 12/2016 |
| WO | WO 2016/210402 | 12/2016 |
| WO | WO 2017/007079 | 1/2017 |
| WO | WO 2017/112004 | 6/2017 |
| WO | WO 2017/172537 | 10/2017 |
| WO | WO 2017/184632 | 10/2017 |
| WO | WO 2017/194478 | 11/2017 |
| WO | WO 2017/198640 | 11/2017 |
| WO | WO 2018/102588 | 6/2018 |
| WO | WO 2018/122862 | 7/2018 |
| WO | WO 2018/144634 | 8/2018 |
| WO | WO 2018/195356 | 10/2018 |
| WO | WO 2019/135504 | 7/2019 |
| WO | WO 2020/095182 | 5/2020 |
| WO | WO 2020/178353 | 9/2020 |
| WO | WO 2020/180740 | 9/2020 |
| WO | WO 2020/223744 | 11/2020 |
| WO | WO 2020/223745 | 11/2020 |
| WO | WO 2021/087158 | 5/2021 |
| WO | WO 2021/105878 | 6/2021 |
| WO | WO 2021/214613 | 10/2021 |
| WO | WO 2021/225916 | 11/2021 |
| WO | WO 2021/226618 | 11/2021 |
| WO | WO 2021/245484 | 12/2021 |
| WO | WO 2021/252675 | 12/2021 |
| WO | WO 2022/099263 | 5/2022 |
| WO | WO 2022/099267 | 5/2022 |
| WO | WO 2022/123402 | 6/2022 |
| WO | WO 2022/137109 | 6/2022 |
| WO | WO 2022/145602 | 7/2022 |
| WO | WO 2022/159738 | 7/2022 |
| WO | WO 2022/162488 | 8/2022 |
| WO | WO 2022/162528 | 8/2022 |
| WO | WO 2022/162614 | 8/2022 |
| WO | WO 2022/167899 | 8/2022 |
| WO | WO 2022/167995 | 8/2022 |
| WO | WO 2022/180466 | 9/2022 |
| WO | WO 2022/189906 | 9/2022 |
| WO | WO 2022/192409 | 9/2022 |
| WO | WO 2022/195391 | 9/2022 |
| WO | WO 2022/204711 | 9/2022 |
| WO | WO 2022/214895 | 10/2022 |
| WO | WO 2022/217269 | 10/2022 |
| WO | WO 2022/219459 | 10/2022 |
| WO | WO 2022/229734 | 11/2022 |
| WO | WO 2022/229739 | 11/2022 |
| WO | WO 2022/236027 | 11/2022 |
| WO | WO 2022/236287 | 11/2022 |
| WO | WO 2023/033869 | 3/2023 |
| WO | WO 2023/033870 | 3/2023 |
| WO | WO 2023/034876 | 3/2023 |
| WO | WO 2024/040008 | 2/2024 |
| WO | WO 2024/059653 | 3/2024 |

OTHER PUBLICATIONS

Elsheikh, Moaaz Mohamed, et al. "A Forsus Distalizer: A Pilot Typodont Study". July-Dec. 2004, KDJ, vol. 7, No. 2, pp. 107-115.

Gilbert, Alfredo. An in-office wire-bending robot for lingual orthodontics. ResearchGate. Article in Journal of clinical orthodontics: JCO, Apr. 2011.

Glauser-Williams Orthodontics: Appliances, http://www.glauserwilliamsorthodontics.com/treatments/orthodontic-appliances.php , accessed Nov. 30, 2015 in 4 pages.

Invisalign® SmileView™, How Would You Look with Straight Teeth?, https://www.invisalign.com/get-started/invisalign-smileview?v=0#start, printed Jun. 7, 2022 in 2 pages.

IPhone 3D scanning to dental software, screen shots at 0:09 and 7:00 of YouTube video, https://www.youtube.com/watch?v=QONGdQ3QiFE, uploaded Oct. 1, 2018 in 2 pages.

Jiang et al. Bending Process Analysis and Structure Design of Orthodontic Archwire Bending Robot. International Journal of Smart Home. vol. 7, No. 5 (2013), pp. 345-352. http://dx.doi.org/10.14257/ijsh.2013.7.5.33.

Jiang et al. A Review on Robot in Prosthodontics and Orthodontics. Hindawi Publishing Corporation. Advances in Mechanical Engineering. Article ID 198748. 2014. 11 pages.

Mahony, Derek, "How We Got From There to Here and Back". Dental Learning Hub (Capture of web page dated Jun. 24, 2013 downloaded from http://web.archive.org/web/20130624145806/http://www.dental-learninghub.com/Clinical/Orthodontics.aspx, downloaded Feb. 7, 2014).

Miller, R.J. et al. "Validation of Align Technology's Treat III™ Digital Model Superimposition Tool and Its Case Application". Orthodontic Craniofacial Res.,2003, vol. 6 (Suppl 1): pp. 143-149.

A ScanBox demo, https://www.youtube.com/watch?v=MsCfv2PDQ0o, screen shots at 0:08 and 0:19 of YouTube video, uploaded May 5, 2019 in 2 pages.

SinodentalGroup, "Braces Bonding Teeth Gems Glue Light Cure Adhesive", https://sinodentalgroup.myshopify.com/products/sino-dental-group-orthodontic-brackets-glue-braces-bonding-light-cure-adhesive-kit?pr_prod_strat=use_description&pr_rec_id=0d0a6cdc9&pr_rec_pid=6687895355572&pr_ref_pid=6705886363828&pr_seq=uniform, downloaded Jun. 7, 2023 in 12 pages.

Southern Maine Orthodontics, Virtual Orthodontic Treatment, https://southernmainebraces.com/virtual-orthodontic-treatment/, printed Jun. 7, 2022 in 3 pages.

Spini et al., "Transition temperature range of thermally activated nickel-titanium archwires", J Appl Oral Sci., Apr. 2014, vol. 22, No. 2, pp. 109-117.

SureSmile. 2013. About SureSmile. (Capture of web page dated Jun. 21, 2013 downloaded from http://web.archive.org/web/20130621031404/http://suresmile.com/About-SureSmile, downloaded Feb. 7, 2014).

Xia, et al. Development of a Robotic System for Orthodontic Archwire Bending. 2016 IEEE International Conference on Robotics and Automation (ICRA). Stockholm, Sweden, May 16-21, 2016. pp. 730-735.

Yang, Won-Sik, et al. "A Study of the Regional Load Deflection Rate of Multiloop Edgewise Arch Wire." Angle Orthodontist, 2001, vol. 7, No. 2, pp. 103-109.

International Search Report for International Application No. PCT/US2018/028437 dated Aug. 9, 2018.

(56) References Cited

OTHER PUBLICATIONS

In Brace, Brush & Floss Easily with In Brace, Uploaded on: May 26, 2022, YouTube, Retrieved from Internet: https://www.youtube.com/watch?v=uAsxiBlbY4Y (Year: 2022).

MEAW School, Introduction to MEAW (Multi-loop Edgewise Arch Wire), Uploaded On: Mar. 24, 2021, YouTube, Retrieved from Internet: https://www.youtube.com/watch?v=ne785jlzN Pg (Year: 2021).

Richard Gawel, Swift Health Systems Raises $45 Million to Finance Invisible Orthodontics, Published on: Dec. 4, 2019, dentistrytoday.com, Retrieved from Internet: https://www.dentistrytoday.com/products/swift-health-systems-raises-45-million-to-finance-invisible-orthodontics/ (Year: 2019).

In Brace, What Is In Brace?—Integration Booster, Uploaded on: May 22, 2023, YouTube, Retrieved from Internet: https://www.youtube.com/watch?v=ANUPkCSfQo4 (Year: 2023).

* cited by examiner

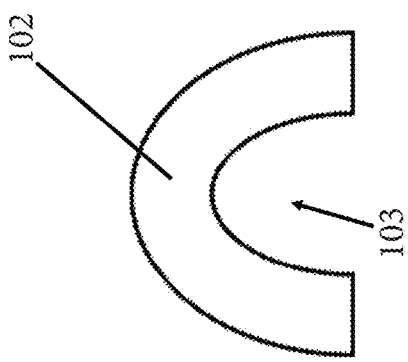
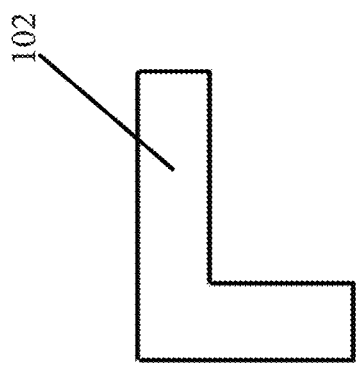
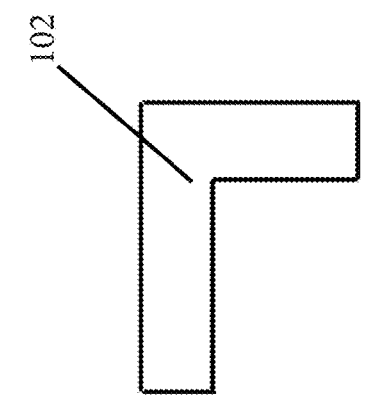
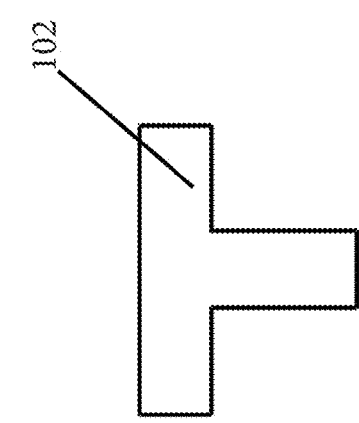
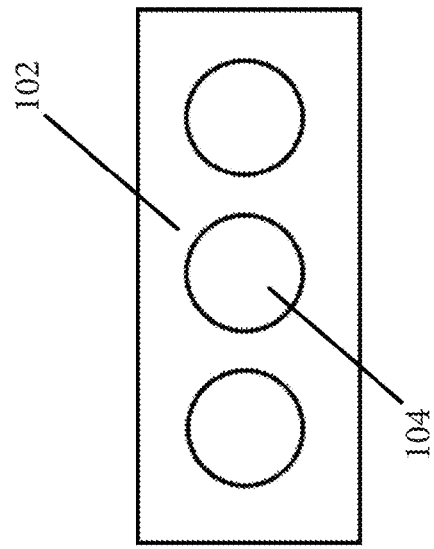
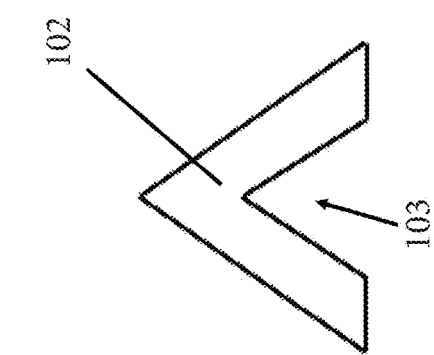
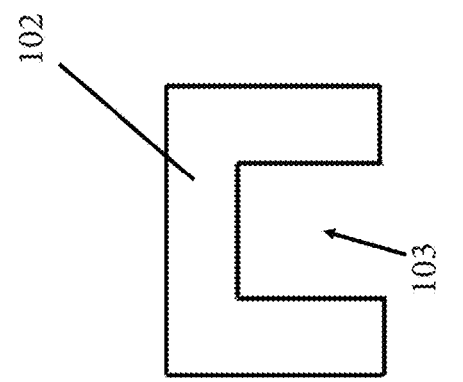

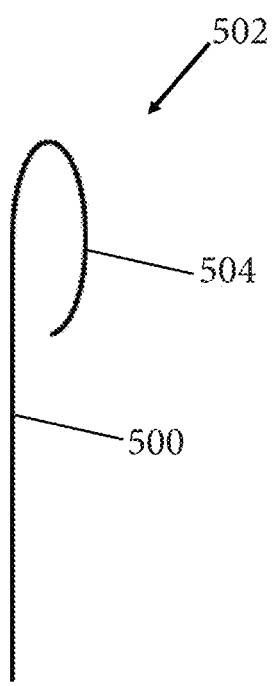
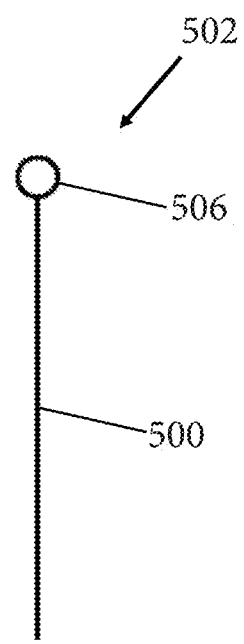
FIG. 5A                    FIG. 5B

INDIRECT BONDING TRAYS, NON-SLIDING ORTHODONTIC APPLIANCES, AND REGISTRATION SYSTEMS FOR USE THEREOF

REFERENCE TO RELATED APPLICATIONS

This application is a continuation of U.S. patent application Ser. No. 17/303,799, filed Jun. 8, 2021, which is a continuation of U.S. patent application Ser. No. 15/957,760, now U.S. Pat. No. 11,058,517, filed on Apr. 19, 2018, which claims priority to U.S. Prov. App. No. 62/488,656, filed on Apr. 21, 2017, which is hereby incorporated by reference in its entirety. Any and all applications for which a foreign or domestic priority claim is identified in the Application Data Sheet as filed with the present application are hereby incorporated by reference under 37 CFR 1.57.

BACKGROUND

Field of the Invention

The invention relates in some aspects to orthodontic appliances, including brackets, archwires, and bonding trays.

SUMMARY

Disclosed herein is an indirect bonding tray for transferring orthodontic brackets to a patient's teeth. The indirect bonding tray has a tray having a lingual, occlusal and buccal side formed from a moldable material and configured to be seated on at least a portion of the patient's dental arch. The tray includes at least one impression of at least one of the patient's teeth and at least one placeholder slot aligned with the at least one impression configured to hold an orthodontic bracket. The tray has one or more handles extending from the occlusal side of the tray. The one or more handles are configured to be grasped by a tool for insertion into the patient's mouth.

The one or more handles may extend along only a portion of the length of the tray extending along the dental arch. The one or more handles may include a plurality of handles. A first handle of the plurality of handles may be positioned on a left distal side of the tray and a second handle of the plurality of handles may be positioned on a right distal side of the tray. A medial anterior portion of the tray may be free of handles. The one or more handles may have an aperture extending through the handle from the lingual side to the buccal side of the tray. The aperture may be configured to receive a dental tool for grasping the tray. The one or more handles may form a tunnel extending along a length of the handle extending along the dental arch.

The tray can be marked with indicia prescribing treatment information. The treatment information may include information registering portions of the tray to anatomical locations of the patient's teeth. The information may register the tray to the upper or lower mandible. The information may register a portion of the tray to the right or left side of the patient's mouth. The information may register a portion of the tray to a specific tooth. The information may demarcate a suggested position for sectioning the tray into separate pieces. The indicia may be a color. The color may be impregnated into the tray. The indicia may be an ink, an impression, a relief, an adhesive label, and/or an embedded tag. The indicia may indicate the location of the at least one impression. The tray may be configured to be seated on only a partial portion of the patient's dental arch.

Disclosed herein is a kit for transferring orthodontic brackets to a patient's teeth. The kit includes a first indirect bonding tray having a lingual, occlusal and buccal side formed from a moldable material and configured to be seated on a first portion of the patient's dental arch. The first tray includes at least one impression of one of the patient's teeth and at least one placeholder slot aligned with the at least one impression configured to hold an orthodontic bracket. The kit includes a second indirect bonding tray having a lingual, occlusal and buccal side formed from a moldable material and configured to be seated on a second portion of the patient's dental arch. The second tray comprises at least one impression of one of the patient's teeth and at least one placeholder slot aligned with the at least one impression configured to hold an orthodontic bracket.

The first and second indirect bonding trays may each be labeled on a surface of the tray to indicate the proper positioning of the tray within the patient's mouth. The first indirect bonding tray and/or the second indirect bonding tray be or may include any of the features of the indirect bonding trays described elsewhere herein.

Disclosed herein is a system for determining the accuracy of the placement of orthodontic brackets on a patient's teeth. The system includes a digital representation of a planned model comprising the patient's teeth and orthodontic brackets positioned on the patient's teeth in planned positions for orthodontic treatment. The system also includes a digital representation of a clinical model of the patient's teeth comprising the patient's teeth and actual positions of the orthodontic brackets after placement onto the patient's teeth. The system also includes a combined model created by a comparison of the digital representations of the planned model and clinical model, wherein the discrepancies in the planned positions and actual positions of the orthodontic brackets are visually discernible from the combined model.

The combined model can be a superimposition of a volume of the planned model and the clinical model. Different portions of a surface of the combined model may be colored differently to reflect which of the planned model and the clinical model forms the different portions of the surface. The combined model may highlight discrepancies between the models a different color. The combined model may depict discrepancies between surface areas of teeth where brackets are bonded. The combined model may depict discrepancies in three-dimensional volumes of space occupied by brackets. The discrepancies between bracket placements may be the only discrepancies depicted. The system may further include software configured to generate statistics related to the accuracy of bracket placement. The software may be configured to collect statistics over a plurality of patients.

Disclosed herein is a method for determining an appropriate force vector to correct the positioning of a tooth of a patient. The method includes obtaining a digital model of the patient's teeth. The digital model includes coordinates for identifying the initial positioning of a tooth to be moved in three-dimensional space. The method includes adjusting the digital model to reposition the tooth to a corrected positioning and determining a travel distance vector between the initial positioning and the corrected positioning of the tooth. The method includes calculating the force vector based at least in part on the travel distance vector, the estimated resistance of the tooth, and the anatomy of the patient's mouth.

The method may further include deforming an archwire to form an interdental loop configured to exert the force vector on the tooth. The method may include adjusting the digital model to reposition a second tooth to a corrected positioning; determining a second travel distance vector between the initial positioning and the corrected positioning of the second tooth; calculating a second force vector based at least in part on the second travel distance vector, the estimated resistance of the second tooth, and the anatomy of the patient's mouth; and deforming the archwire to form a second interdental loop configured to exert the second force vector on the second tooth. The method may include calculating a plurality of force vectors for a plurality of the patient's teeth. The plurality of force vectors may be configured to move the plurality of teeth into corrected positions after the same duration of treatment time.

The initial positioning of the tooth may represent the position of a tooth after orthodontic treatment. The method may include obtaining a second digital model of the patient's teeth after a period of treatment time. The model may include coordinates for identifying the updated positioning of the tooth after it has been moved in three-dimensional space. The method may include measuring an actual travel distance vector of the tooth and a discrepancy between the actual travel distance vector and the previously determined travel distance vector. The method may include adjusting the digital model to reposition the tooth to a second corrected positioning. The method may include determining a second travel distance vector between the updated positioning and the second corrected positioning of the tooth. The method may include calculating a second force vector based at least in part on the second travel distance vector, the estimated resistance of the tooth, and the anatomy of the patient's mouth, wherein calculating the force vector includes using the measured discrepancy as feedback to improve the calculation. Using the measured discrepancy as feedback may include updating the estimated resistance of the tooth.

Disclosed herein is an orthodontic appliance having a plurality of orthodontic brackets and an archwire. The archwire has a plurality of male fasteners for locking into non-sliding engagement with the plurality of orthodontic brackets and at least one interproximal loop configured to exert a corrective force on one or more of the orthodontic brackets. The archwire has atraumatic terminal ends.

At least one atraumatic terminal end may be formed from a terminal loop at a distal end of the archwire. A distal end of the archwire may be bent in an occlusal and/or dental direction. At least one atraumatic terminal end may be formed from a smooth polymeric bulb positioned at a distal end of the archwire. At least one atraumatic terminal end may be formed by a distal end which is not configured to extend distally beyond the most distal bracket of the plurality of orthodontic brackets. The distal-most orthodontic bracket may have an archwire slot configured to lock the archwire within the distal-most orthodontic bracket. The archwire slot may not extend to a distal side of the distal-most orthodontic bracket.

Disclosed herein is an orthodontic appliance having a plurality of orthodontic brackets and an archwire. The archwire has a plurality of male fasteners for locking into non-sliding engagement with the plurality of orthodontic brackets and at least one interproximal loop configured to exert a corrective force on one or more of the orthodontic brackets. At least some of the plurality of brackets and at least some of the male fasteners and/or interproximal loops are marked with a colors that distinctly identify which of the at least some of the plurality of brackets is intended to be registered with which of the at least some of the male fasteners.

The color markings may be temporary. At least some of the plurality of brackets may be marked with a removable color insert. The removable insert may be configured to occupy at least a portion of the archwire slot. The archwire and/or the at least some of the plurality of brackets may be marked with a biocompatible dye.

Disclosed herein is an orthodontic appliance having an archwire including at least one interproximal loop configured to exert a corrective force an orthodontic bracket and a crimpable stop for engaging with the orthodontic bracket. The crimpable stop is configured to be crimped so as to secure the archwire to the orthodontic bracket.

The crimpable stop may be a tubular member configured to be received over the archwire. Crimping the crimpable stop may prevents the crimpable stop from sliding with respect to the archwire. The crimpable stop may have a closed circumference and the crimpable stop may be configured to be advanced over a distal end of the archwire. The crimpable stop may include a slit along the length of the crimpable stop forming a partially-closed circumference. The crimpable stop may be configured to be inserted over the archwire via the slit. The length of the crimpable stop may correspond to a length of a recess in the orthodontic bracket and the crimpable stop may be configured to prevent a portion of the archwire enclosed within the crimpable stop from sliding mesially or distally beyond the recess. The crimpable stop can be color coded to indicate which orthodontic bracket it is intended to be secured within. The orthodontic appliance may include the orthodontic bracket.

BRIEF DESCRIPTION OF THE DRAWINGS

FIGS. 1A-1C illustrate an example indirect bonding trays. FIG. 1A depicts an indirect bonding tray having bilateral handles and which has been labeled and sectioned. FIGS. 1Bi-1Bvii schematically illustrate various configurations of handles to be used with indirect bonding trays. FIGS. 1Bi-1Bvi illustrate examples of handle cross sections and FIG. 1Bvii illustrates a side view of a handle comprising apertures. FIG. 1C depicts an indirect bonding tray section configured to be applied to only a portion of a dental arch.

FIG. 2B shows a close-up of the superposition in FIG. 2A.

FIGS. 5A-5B schematically illustrate examples of archwires comprising atraumatic terminal ends. FIG. 5A depicts a distal end of an archwire comprising a terminal loop. FIG. 5B depicts a distal end of an archwire comprising a bulbous cap.

FIG. 6A depicts a crimpable stop positioned within an orthodontic bracket. FIG. 6B depicts an example of an archwire comprising a plurality of crimpable stops positioned between interproximal loops.

DETAILED DESCRIPTION

Figure 3:
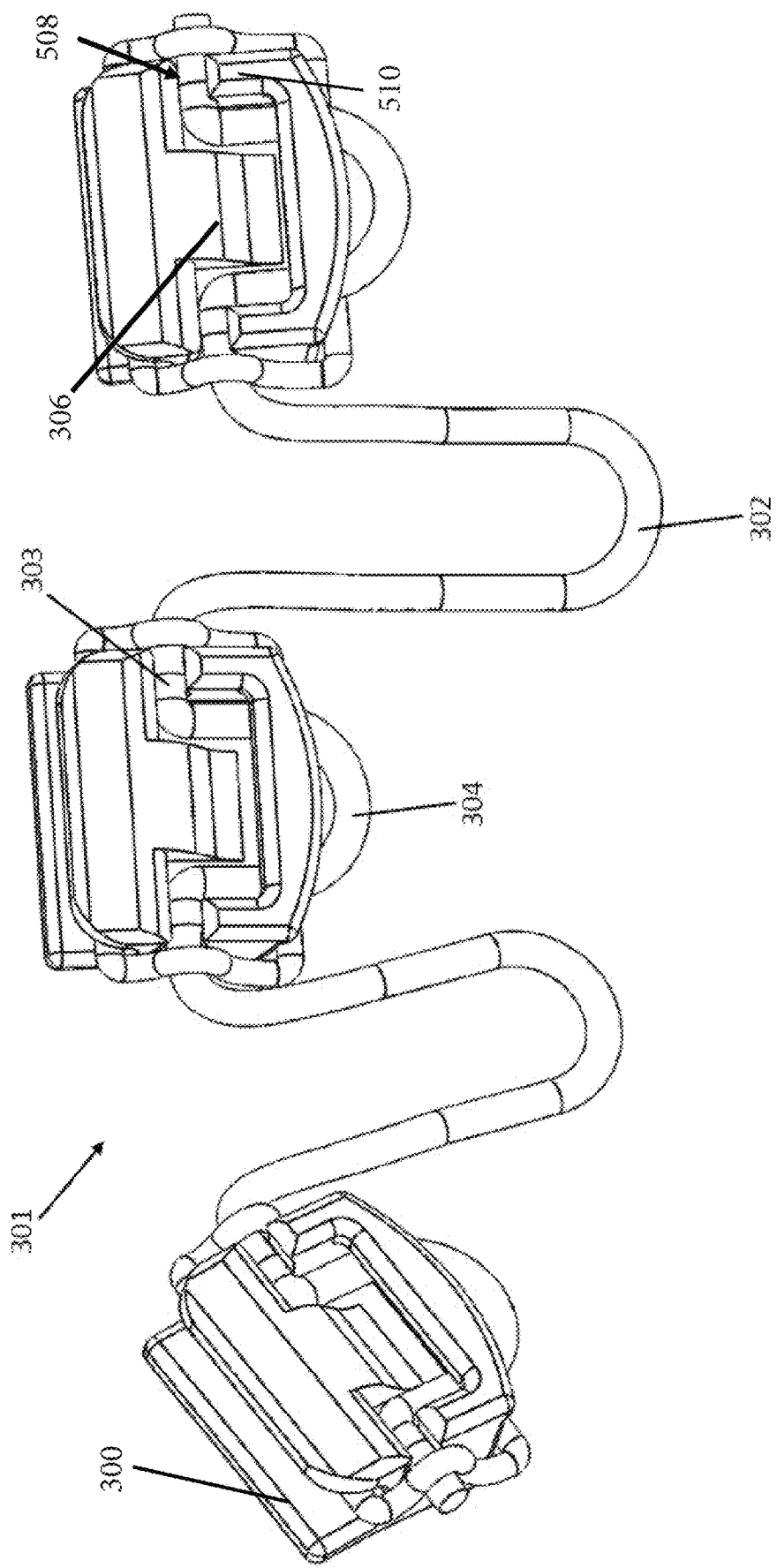
FIG. 3 illustrates an example of an orthodontic appliance comprising an archwire and a plurality of orthodontic brackets configured for non-sliding mechanics.

Orthodontic appliances are used to correct malocclusion of the teeth. Orthodontic appliances generally can include brackets bonded to individual teeth and an archwire adjoining the brackets for exerting forces between the teeth to bring them into proper alignment. Non-sliding orthodontic appliances may employ an archwire and brackets that are configured to lock together such that the archwire is unable to slide relative to the brackets. Non-sliding orthodontic appliances can, in some cases, provide better control over the forces applied to correct the positioning of the patient's teeth. Archwires used in non-sliding orthodontic devices can include in some cases male fasteners for locking into brackets in a non-sliding engagement and interproximal structures, e.g., loops positioned between some and/or each and every male fastener for exerting precise corrective forces on adjacent brackets (FIG. 3). Brackets can be applied to a patient's teeth using indirect bonding trays which hold a plurality of brackets in proper alignment relative to the patient's teeth Disclosed herein are systems, methods, and devices for transferring and applying orthodontic brackets, or other suitable orthodontic appliances, to a patient's teeth using indirect bonding trays. Indirect bonding trays can be custom shaped to fit one or more of an individual patient's teeth. The indirect bonding trays may fit the entire upper or lower dental arch or a portion of the upper or lower dental arch. The indirect bonding tray may be formed from a physical model of the patient's teeth and includes one or more spaces or wells for accommodating the orthodontic brackets to be transferred to the patient's teeth. The physical model may be obtained from a digital representation of the patient's teeth, which can be digitally modified to model the precise placement of the orthodontic brackets on the patient's teeth. The basis of the digital representation can be acquired from a 3D intraoral scan of the patient's teeth, a physical model of the patient's teeth, and/or a negative impression of the patient's teeth. The indirect bonding tray may be formed from polyvinyl siloxane (PVS) or any other suitable elastomeric material, such as those used to form dental impressions. The indirect bonding tray may be entirely or partially molded to a patient's teeth.

Figure 1A:
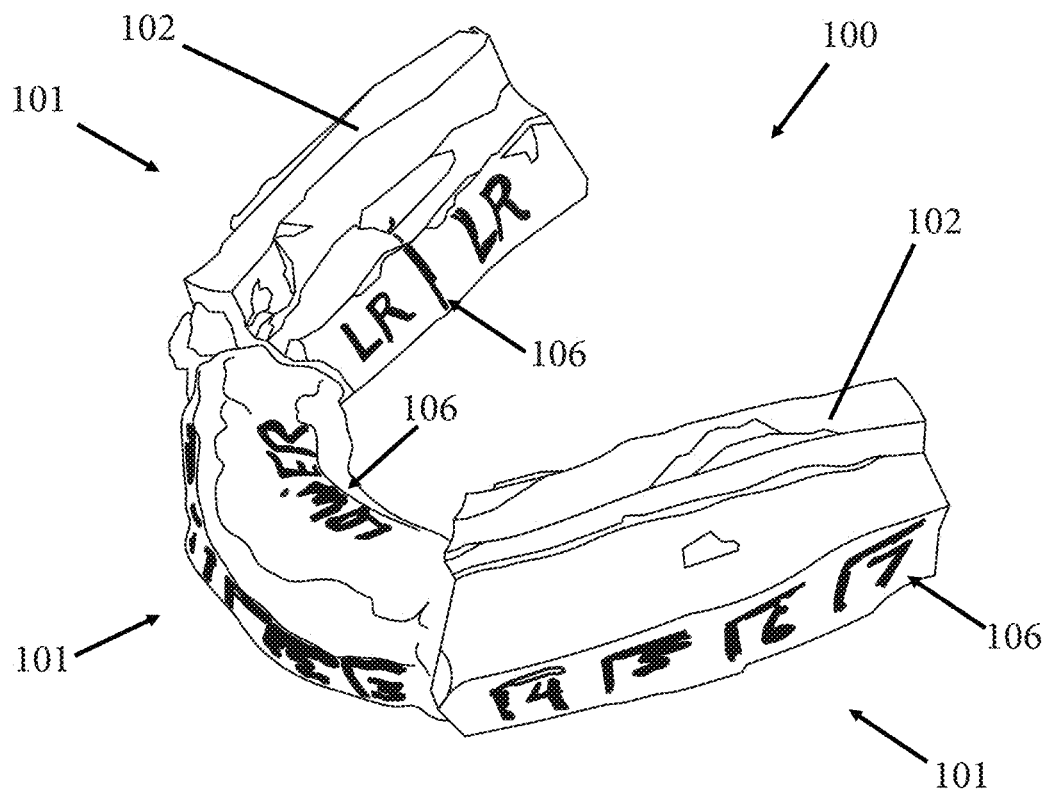

The indirect bonding tray may generally comprise a buccal side, a lingual side, and an occlusal side for enclosing the one or more teeth. The indirect bonding tray may have a generally rounded or rectangular outer cross-section. The cross-section of the indirect bonding tray may be uniform along the length of the dental arch or may vary (e.g., change shape or dimensions). In some embodiments, the indirect bonding tray may comprise one or more handles, which can be integrated handles, in some embodiments. FIG. 1A shows an example of an indirect bonding tray 100 comprising two integral handles 102. The handles 102 may be configured to facilitate insertion and/or placement of the indirect bonding tray 100 in a patient's mouth with the use of tool. The handles 102 can allow an orthodontist to insert the indirect bonding tray 100 into the mouth of the patient without use of his or her hands. The one or more handles 102 may extend (e.g., an increased height or other dimension) from the buccal, lingual, and/or occlusal side of the indirect bonding tray 100. The handle 102 may be a flange, bridge forming a tunnel, or other appropriate shape. The handle 102 may extend along a longitudinal axis of the indirect bonding tray 100 defined by the curvature of the dental arch. The handle 102 may extend the entire length of the indirect bonding tray 100 or may extend only along one or more portions of the indirect bonding tray. For example, the handles 102 shown in FIG. 1A extend only along the distal right and left ends of the arch. The one or more handles 102 could be bilateral as shown, or unilateral in other embodiments (e.g., the handle 102 is only disposed on the right or left side of the arch), and render the device symmetric or asymmetric along one, two, or more axes.

The absence of the handle 102 along the anterior portion of the indirect bonding tray 100 may facilitate access to the distal portions of the tray once the tray is inserted into the patient's mouth. A practitioner's hand, fingers, or tools may more readily access the distal portion of the indirect bonding tray 100 and/or the patient's dental arch over the anterior medial portion of the indirect bonding tray 100 when the handle 102 is absent from that portion. The indirect bonding tray 100 may be formed with a variable cross section along the length corresponding to the dental arch. For example, as shown in FIG. 1A, the medial anterior portion of the tray 100 may have a smaller cross-sectional area or general size than the surrounding distal portions. The smaller size of the anterior teeth may allow fabrication of the corresponding section of the indirect bonding tray 100 to be made smaller. The smaller size of the medial anterior portion may, for example, facilitate access to the distal portions of the mouth and tray 100.

The handle 102 may comprise any suitable shape that facilitates grabbing the indirect bonding tray 100 with an instrument. FIGS. 1Bi-1Bvii schematically illustrate various examples of possible configurations of the handle 102. The handles 102 may be attached or integrally joined to the indirect bonding tray 100 along the bottom of the handle 102. FIGS. 1Bi-1Bv schematically illustrate cross-sections of the handles 102 taken along the longitudinal axis aligned with the dental arch. FIG. 1Bvi schematically illustrates a lingual or facial side of a handle 102. In some embodiments, the handle 102 may be a flange. The flange may have a rectangular shape, as shown in FIG. 1A. The flange may have a T-shape (FIG. 1Bi). In some embodiments, the handle 102 may be a flange having an L-shape (FIGS. 1Bii and 1Biii). In some embodiments, the handle 102 may have a U-shape to form a tunnel 103 that the orthodontist can use to grab onto with a tool. The tunnel 103 may be rounded (FIG. 1Biv), squared, rectangular (FIG. 1Bv), triangular (FIG. 1Bvi), etc. In some embodiments, the tunnels 103 may be formed in a substantially lingual-to-facial direction rather than a mesial-to-distal direction. The handle 102 may have one or more apertures 104 disposed through it, extending, for example, from the lingual side to the facial/labial/buccal side of the handle 102, as shown in FIG. 1Bvii. The apertures 104 may allow the insertion of a tool or a portion of a tool, such as tweezers or graspers, through the aperture 104 to grasp the indirect bonding tray 100. The apertures 104 may be round, square, rectangular, oval, oblong, or any other suitable shape. There may be 1, 2, 3, 4, 5, or more than 5 apertures 104 in each handle 102. In some embodiments, the handle 102 may comprise both a tunnel 103 and one or more apertures 104, the one or more apertures extending through the lingual side, the facial side, or both the lingual and facial side of the tunnel 103. The handles 102 may be substantially rigid. The handles 102 may have a degree of flexibility to allow easy bending and manipulation by the insertion tool. In some embodiments, the handle 102 is integrally molded with the indirect bonding tray 100 from the same impression material as the tray 100. In some embodiments, the handle 100 is a solid insert (e.g., plastic or metal) that may be integrated into the tray 100 as it is being molded or inserted into (e.g. pressed into) the tray 100 after the tray has been fabricated. In some embodiments, the handle 102 is attached to the tray 100, such as with a biocompatible adhesive. In some embodiments, the handle 102 is removable from the tray 100, such as with perforations or a frangible portion. In some embodiments, the handle 102 may include a magnet or ferromagnetic material to removably associate with a magnetic or metal portion of a tool.

Figure 1C:
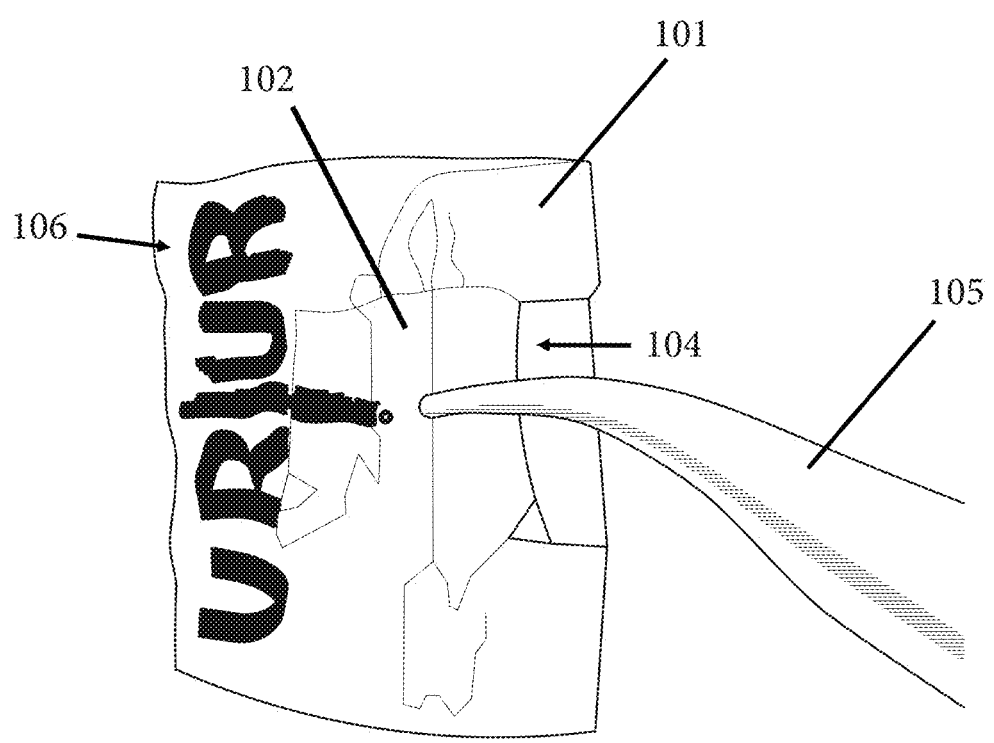

FIG. 1C, shows an example of an indirect bonding tray section 101 comprising an integral handle 102. The handle 102 of FIG. 1C comprises an aperture 104 forming a bridge along the length of the handle for facilitating grasping by a tool 105. In some embodiments, the indirect bonding tray 100 may be sectioned into one or more pieces or sections 101 (e.g., about or at least about two pieces, three pieces, four pieces, five pieces, etc.) prior to applying the tray 100 to the patient's mouth. In some embodiments, the indirect bonding tray 100 may be fabricated as one or more partial sections 101 corresponding to a patient's dental arch or a portion of a patient's dental arch. Each section 101 may have one or more handles 102, only some of the sections 101 may have one or more handles 102, or none of the sections 101 may have a handle 102. The sections 101 may be inserted into a patient's mouth one after another. The smaller size of the sections 101 may facilitate insertion of the sections 101 into the patient's mouth and/or more accurate seating on the patient's teeth. Anatomical structures may be taken into account in determining where to section an indirect bonding tray 100. For example, one tray could be used to place brackets on the left pre-molar and molar teeth, one on the cuspid and incisor teeth, and one on the right pre-molar and molar teeth. If upper and lower brackets are being applied, the sections 101 for the upper indirect bonding trays may be sectioned the same as or different from the section for the lower indirect bonding trays. FIG. 1A shows an indirect bonding tray which has been sectioned into three pieces.

The partial sections 101 may be configured to extend across distal or posterior teeth, across anterior or medial teeth, across the left teeth, across the right teeth, across the molar teeth, across the biscuspid teeth, across the bicuspid and cuspid teeth, across the incisors, across any adjacent combinations, or across any subset of teeth within those sections. In general, the sections 101 and/or the handles 102 on a tray 100 or section 101 may extend across one tooth, two teeth, three teeth, four teeth, five teeth, six teeth, seven teeth, eight teeth, nine teeth, ten teeth, eleven teeth, twelve teeth, thirteen teeth, fourteen teeth, fifteen teeth, or any portion of the dental arch (16 teeth) or a subset of adjacent teeth. Accordingly, trays 100, corresponding to an entire dental arch or a portion of a dental arch, the third molar, may be sectioned generally between the third molar and the second molar, between the second molar and the first molar, between the first bicuspid and the second bicuspid, between the first bicuspid and the cuspid (canine tooth), between the cuspid and the lateral incisor, between the lateral incisor and the central incisor, or between left and right central incisors.

In some embodiments, pieces of an indirect bonding tray are formed by fabricating a unitary indirect bonding tray and sectioning (e.g., cutting) the unitary tray into several pieces. The unitary indirect bonding tray may be sectioned before or after insertion of the orthodontic brackets into the tray. Some portions of the unitary bonding tray may be sectioned off and discarded where no bracket is to be applied to the corresponding teeth. In some embodiments, portions of the indirect bonding tray corresponding to teeth without any brackets may be retained and used to facilitate seating of the indirect bonding tray in the patient's mouth. In some embodiments, sections of the indirect bonding tray may be fabricated separately rather than sectioned from a unitary tray. In some implementations, separately fabricated sections may be subsequently joined together prior to inserting the indirect bonding tray into the patient's mouth.

Indirect bonding trays may be labeled with one or more indicia or markers. Labeling indirect bonding trays may be especially advantageous for sectioned indirect bonding trays in order to facilitate proper registration between the various pieces of the tray and the teeth for which they are configured. Labeling may prevent confusion as to which piece is to be applied where and promote faster and more efficient transferring of brackets to the teeth. Labeling of the indirect bonding trays may be accomplished by any suitable means. In some embodiments, the tray may be impregnated with a colored dye during its fabrication to create a multi-colored tray. The color may correspond or register to a particular anatomical location per a color-code. This may be especially useful for distinguishing between upper and lower indirect bonding trays. The dye may be used to locally color regions of a single tray. The regions may correspond to pieces which are to be separately sectioned. In some embodiments, identifying information, such as tooth identifiers, may be printed on the surface of the indirect bonding tray. The information may be printed using for example a marker with non-toxic ink, stamped on the tray, or impressed into the tray. FIGS. 1A and 1C demonstrate the use of textual and graphic indicia 106 to visually provide treatment information to the practitioner. The indirect bonding tray 100 shown in FIG. 1A includes identifying information on the surface of the tray, including tooth identifiers on one side, represented by numbers aligned approximately at the corresponding position of the identified tooth within the tray, bracket symbols indicating the medial and occlusal side of each tooth, an indication that the tray is for the lower mandible ("lower") or the "lower right" portion of the mandible ("LR"), and suggested delineations demarcating where a tray could be sectioned. The delineations may be positioned approximately between teeth so that the tray is not sectioned through a portion corresponding to a tooth. The indirect bonding trays may also be labeled with adhesive labels. The adhesive labels can for example be printed out on a paper that has adhesive on one side. The paper may have a peel-away backing. The labels can be adhered to the surface of the indirect bonding tray. Other information that the trays can be labeled with include details of the orthodontic treatment, such as which teeth are to receive brackets, the total number of brackets, etc. Impressions of the patient's teeth may also facilitate proper registration of the indirect bonding tray. The tray may include impressions for teeth that are not to receive brackets in order to provide increased registration of the tray with the patient's dental arch. In some embodiments, the label could include a barcode, RFID tag, or another identification element.

Figure 2A:
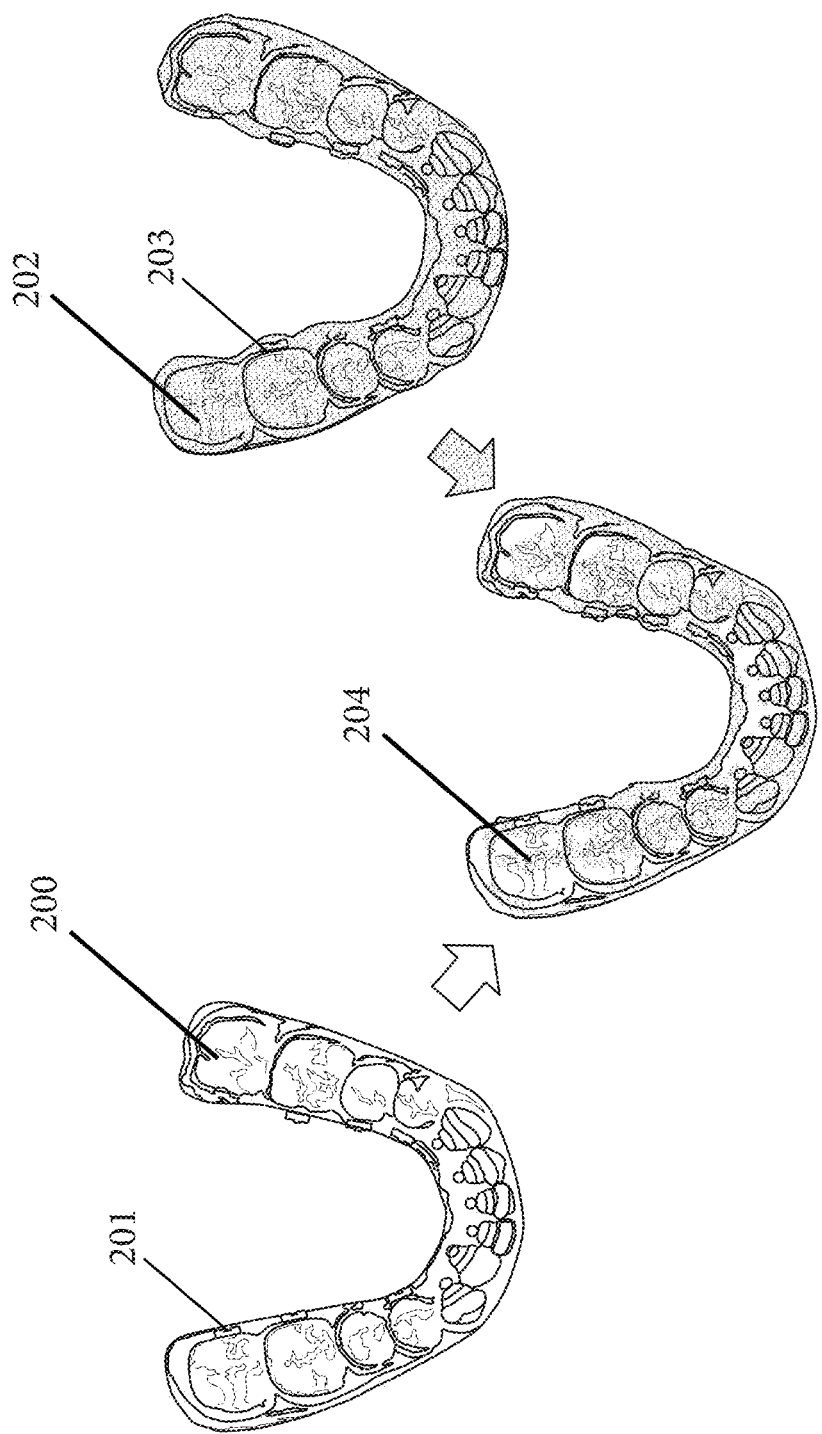
FIGS. 2A-2B schematically illustrate a system and method for comparing a planned digital model of orthodontic treatment to digital information representing a clinical model after bonding. The model is superimposed with the digital information to allow evaluation of the accuracy of the clinical model relative to the planned treatment.
Figure 2B:
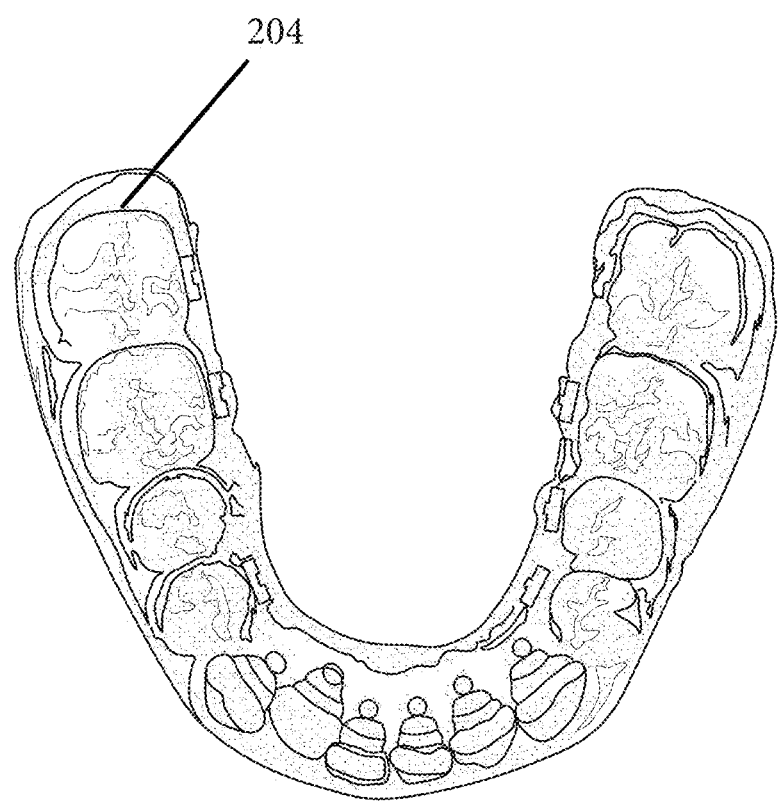

After bonding one or more brackets or other orthodontic appliances to a patient's teeth, the placement of the brackets can be digitally checked for accuracy. A digital representation of the patient's teeth post-application can be created from a 3D intraoral scan or by other suitable means (e.g., a scan of a model or negative impression). The 3D scan of the patient's teeth can be imported into software that allows digital manipulation and/or analysis of the 3D scan. The digital model of the patient's teeth with applied brackets can be compared to an initial digital plan of the patient's teeth, including proposed placement of the brackets. For example, as illustrated in FIG. 2A, the initial digital plan 200 for applying the brackets 201 (uncolored) and the clinical model 202 after applying (bonding) brackets 203 (shown in dark) can be digitally compared via a model 204, such as by being superimposed, to allow visual evaluation of the discrepancies. FIG. 2B illustrates an image of the superimposed model 204 of FIG. 2A alone. In embodiments, where the comparison comprises a superimposition of the two models 200, 202, the two models may be additively combined to form a single volume having a continuous external surface (model 204). The surface of each constituent model 200, 202 may be visible only where it forms the external surface of the superimposed model 204 (is positioned relatively outside the surface of the other constituent model). The superimposed model 204 or image may be variably colored (or otherwise visually distinguished) across different portions of its external surface according to which constituent model 200, 202 forms the external surface of the respective portion. In some implementations, in which the outer surfaces of the constituent models 202, 204 are negligibly different when superimposed, the color of one of the two constituent models may be selected as a default or a third color may be used.

The software may compare the 3D geometry of the superimposed models 204 and determine areas of discrepancy. In some embodiments, the digital plan 200 and clinical model 202 are superimposed as different colors and the discrepancies are not highlighted, as seen in FIGS. 2A and 2B. The practitioner may evaluate the superimposed model 204, for instance, by visually discerning whether the superimposed brackets 201, 203 are aligned. For example, visual inspection may determine whether the corresponding brackets 201, 203 from the two constituent models 200, 202 substantially overlap forming the volume that would be expected from a single bracket or whether the two constituent brackets 201, 203 are substantially displaced from one another. In some implementations, the software may visually highlight the areas of discrepancy to allow for easy evaluation by the orthodontist. The areas of discrepancy may be marked as the areas on a tooth's surface where the bracket was planned to be bonded but was not actually bonded and/or areas on a tooth's surface where the bracket was actually bonded but not planned to be bonded. These two types of discrepancies may be merged, such as marked by a single color, or distinguished (such as being marked by different colors). The software may highlight only the surface areas of the teeth or may highlight the 3D space where brackets were planned to occupy and/or were not planned to occupy. The software may compare the spaces occupied by the teeth and the brackets. The digital accuracy information, or any portion of the accuracy information, may be visually displayed on the superimposed model 204 or on either of the individual images (the digital plan 200 or the clinical model 202). The orthodontist may use the accuracy information to evaluate the application of the orthodontic brackets and determine whether any corrections need to be made or whether any discrepancies or inaccuracies fall within a suitable range of error and/or are negligible. In some embodiments, the software may highlight areas of overlap rather than discrepancy. In some embodiments, the areas of overlap and discrepancy may be highlighted different colors. In some embodiments, the discrepancies are depicted on either the constituent planned model or the constituent clinical model. The discrepancies may be digitally limited to those in the bracket positions. The anatomical features may be assumed to be identical. Bracket positioning can be determined relative to anatomical landmarks.

The software may generate useful information regarding the accuracy of bracket placement. For example, in some implementations, the software may be programmed to perform an automated evaluation. The automated evaluation may report which brackets (i.e. teeth) were or were not accurately positioned. The software may use thresholds in displacement distances (e.g., distances between centers of brackets or maximum distances between corresponding points on edges of brackets from the two constituent models 200, 202), volumes (e.g., additive volume of brackets 201, 203), or surface areas (e.g., surface area of tooth covered by bracket on the superimposed model 204) to qualify the bracket placements. The software may indicate (e.g. via a color or a box) on one or more of the models which brackets were within a level of tolerance and/or which brackets were outside the level of tolerance. The practitioner may be able to manually set the levels of tolerance and/or they may be set by the software. Statistics regarding the placement of the brackets may be accumulated for one or more patients. Statistical data reflecting the accuracy of bracket placement may be collected based on specific practitioners, teeth, types of brackets, bonding procedure, etc.

FIG. 3 illustrates an example of an orthodontic appliance 301 which uses non-sliding mechanics. The archwire 303 may comprise male loops or male fasteners 304 configured to be inserted into orthodontic brackets 300 in a configuration which prevents sliding of the archwire 303 relative to the orthodontic brackets 300. The archwire 303 may comprise interproximal loops 302, which may be positioned between one or more pairs of adjacent brackets 300. The interproximal loops 302 may be configured to exert forces on the adjacent teeth to which the brackets 300 are bonded. The interproximal loops 302 may be configured to exert precision and/or customized forces on specific teeth. The forces from opposing sides of an orthodontic bracket 300 may be accounted for in providing a net force on each individual tooth.

Disclosed herein are systems and methods for calculating appropriate force application vectors configured to correct malocclusion of the patient's teeth. The system may include software for modeling the force vectors. The vectors may be determined by comparing a digital model of the pre-treatment geometry of the patient's teeth comprising initial tooth positions to a digitally corrected model of the patient's teeth comprising ideal tooth positions. A vector in three-dimensional (3D) space can be calculated for each individual tooth between its initial position ($x_i$) and its final position ($x_f$). Using the travel distance (length of the vector) along with information about the resistance of the teeth (e.g., the resistive force of tissue and the friction of tooth surface rubbing against one another), the tissue (e.g., the health of the gums), the jaw anatomy, and/or other patient factors (e.g., age, sex, etc.) a force vector can be determined for relocating the tooth from its initial position to its final position. The amount of force to be applied may be proportional to the resistance. The resistance of each tooth may be a scalar or may be a vector. The force may be calculated to achieve displacing the tooth across the travel distance over a predetermined treatment time (after which the archwire may be removed or replaced). Alternatively, using this information, the expected treatment time, or time it will take to relocate the tooth from its initial position to its final position, may also be estimated for a given applied force. In some embodiments, the determined treatment plan may comprise a single application of a relatively constant force. In some embodiments, the determined treatment plan may comprise sequential applications of various force vectors to appropriately reposition the tooth. The calculated force vector may be applied to the tooth using an archwire. The software may be able to determine the optimal number of treatments (e.g., archwire replacements). The software may account for the different force/treatment time ratios of teeth within the dental arch in determining appropriate forces to apply to each treated tooth such that the teeth are all moved into expected positions at the end of a definite treatment time. In some implementations, the applied force may not exceed a maximum level of force to ensure patient comfort and/or safety.

As shown in FIG. 3, referenced elsewhere herein, the archwire can be bent between brackets to form interproximal loops 302, which can be biased to expand outward or contract inward applying force against the brackets 300 on adjacent teeth. The interproximal loops 302 may be configured to rotate one or more teeth. The archwire 303 can be twisted around its axis to provide a torsional force on the adjacent bracket or brackets 300. Brackets 300 that employ non-sliding mechanics, wherein the archwire 303 is fixedly secured to each bracket 300 and does not slide relative to the bracket 300, may be ideal for using an archwire 303 to provide custom individualized forces to each tooth. The archwire 303 can comprise a shape memory alloy (e.g., nitinol). The shape-memory archwire 303 may be programmed with a pre-deformed shape that when applied to the ideal tooth positions does not cause the teeth to move. The shape memory archwire 303 may be deformed with interproximal loops 302, each configured such that the transition from the deformed geometry when applied to the initial positioning of teeth to the pre-deformed geometry when applied to the final positioning of teeth supplies the appropriate pre-determined force vector to the adjacent teeth to move the teeth toward their planned final positions. The interproximal loops 302 and/or twisting of the archwire 303 may be configured to be in an unbiased configuration (e.g., a preprogrammed shape memory configuration) in the final position of the teeth and the initial archwire configuration may be configured to exert the calculated force. The precise shape or configuration of the archwire in the initial configuration may control the force vector asserted on the adjacent teeth. More complex treatment plans may be accomplished by changing archwires at different points throughout the treatment process to adjust the force vectors applied on one or more of the patient's teeth.

Figure 4:
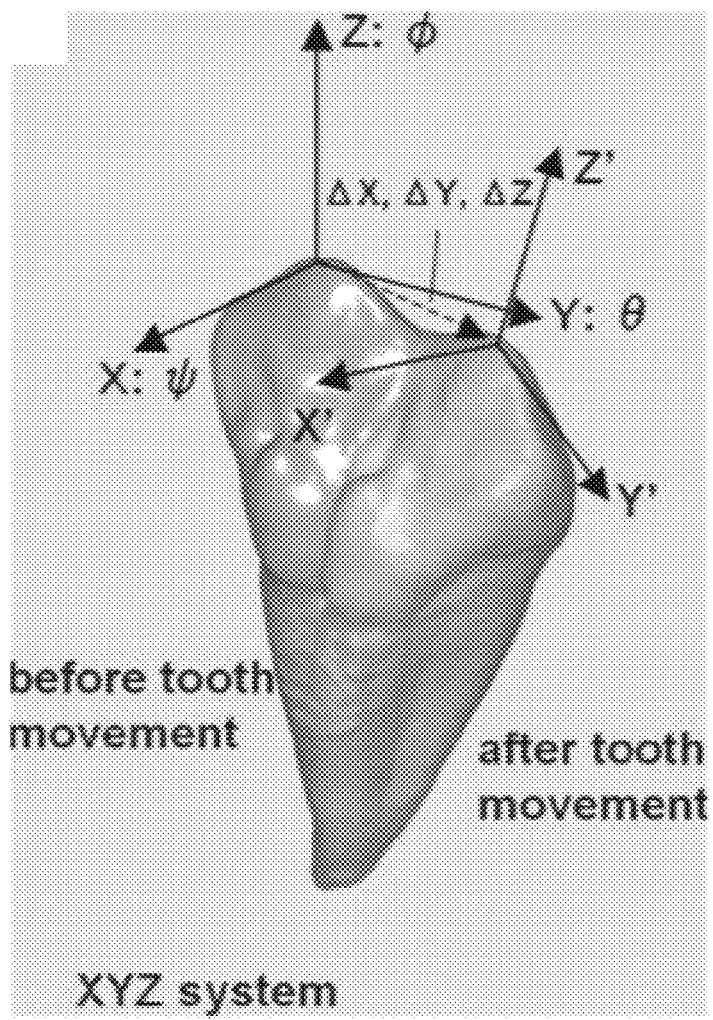
FIG. 4 illustrates an example of a superimposed model of a single tooth comprising positions from before and after an orthodontic treatment and demonstrating the actual tooth displacement vector measured by the model.

In some implementations, the actual displacement observed or measured after the application of orthodontic treatment, such as with an archwire comprising interproximal loops 302, may be used to generate feedback, which may improve the modeling of a subsequent archwire and one or more force vectors. Tooth positioning may be obtained by 3D intraoral scans, impressions, or any other suitable method, including those discussed elsewhere herein. FIG. 4 schematically illustrates a 3D model showing the superimposed position of a single tooth before and after orthodontic treatment (i.e. tooth movement). The original position of the tooth is indicated in a 3D coordinate space (an XYZ coordinate grid) as X, Y, and Z ($\Psi$, $\theta$, $\Phi$). The position of the same tooth after treatment/movement is indicated by X', Y', and Z'. The displacement vector between the initial and final positions is indicated by $\Delta X$, $\Delta Y$, and $\Delta Z$. The actual displacement vector may be compared to the anticipated or planned displacement vector from which the force vector for the original treatment was calculated. Using this feedback, the algorithm for calculating force vectors configured to displace teeth may be updated to more accurately move the tooth or teeth in the next round of treatment. The difference between the planned displacement and the actual displacement may reflect patient-specific factors that affect how the tooth responds to force. These factors (age, sex, gum health, etc.) may be accounted for in variables such as the tooth resistance, for instance. For example, in a non-limiting embodiment, the resistance variable may be adjusted such that the planned model of the prior treatment more accurately approximates the actual movement observed. The interproximal loops 302 in successive archwires can be continually improved to optimize force delivery via the feedback loop. In some implementations, the system may become progressively smarter (more accurate) as more data is input for a specific patient. Increasing the number of archwire replacements may increase the accuracy of treatment. For instance, the archwire may be replaced 1, 2, 3, 4, 5, 6, 7, 8, 9, 10, 11, 12, 13, 14, 15, 16, 17, 18, 19, 20, 21, 22, 23, 24, 25, 26, 27 28, 29, 30, or more than 30 times during the orthodontic treatment. In some embodiments, the archwire may be replaced approximately once every month, 2 months, 3 months, 4 months, 5 months, 6 months, more than once a month, or less than every 6 months. In some embodiments, the archwire may be replaced more frequently during the initial period of orthodontic treatment so the model learns more effectively early on. In some embodiments, the archwire may be replaced at relatively frequent intervals throughout the entire orthodontic treatment. In some embodiments, the archwire may be replaced more frequently near the end of the orthodontic treatment to closely fine-tune the final positioning. The improved accuracy of treatment from the feedback model may ultimately decrease the time it takes to complete the entire orthodontic treatment, as the archwires will be less likely to overcorrect or under-correct teeth positions and additional corrections will be less needed.

Disclosed herein is an archwire for applying corrective force on a patient's teeth. The archwire may apply force through brackets bonded to the patient's teeth. The archwire may be coupled to each bracket through non-sliding mechanics such that the archwire is fixed relative to each bracket, such as archwire 303. Force may be applied to move the teeth via interproximal loops 302 formed in the archwire adjacent to the brackets, as referenced elsewhere herein. The archwire may be generally curved to match the curvature of the patient's upper or lower dental arch. The archwire generally extends from a right end to a left end of the mouth. The left end of the archwire terminates either within or distal to the distal-most bracket positioned on the left side of the patient's mouth. The right end of the archwire terminates either within or distal to the distal-most bracket positioned on the right side of the patient's mouth. Often, the distal-most brackets will be positioned on a patient's molar teeth. A non-sliding orthodontic appliance is advantageous in that the archwire will not slide relative to the brackets, including the most distal brackets, and therefore will not slide distally relative to the distal-most brackets. In orthodontic appliances that employ sliding-mechanics, the archwire usually slides continually in a distal direction as the treatment progresses. Because the archwire of a non-sliding orthodontic appliance cannot slide distally relative to the distal-most brackets, the right and left ends will not inadvertently slide into and jab the patient's oral tissue causing discomfort or pain, even as treatment progresses.

FIGS. 5A-5B schematically illustrate examples of archwires 500 with modified distal ends. The right and left ends of the archwire may further be configured to form atraumatic terminal ends 502 so as to avoid causing pain or discomfort to the patient during any transient contact with oral tissue of the patient's mouth. Doing so may increase patient tolerance of the orthodontic appliance. In some embodiments, the right and left ends of the archwire 500 may be bent into terminal loops 504 to form atraumatic terminal ends 502. FIG. 5A schematically illustrates a distal end of the archwire 500 comprising a terminal loop 504. The terminal loops 504 may be configured so that the ends of the archwire are bent back on themselves and point toward the most distal brackets, in an occlusal direction away from the patient's oral tissue, in a direction toward the tooth, or in some combination thereof. The terminal loop 504 may be configured to direct the right and left ends of the archwire 500 away from the adjacent lingual or buccal/labial tissue. Any direction which positions the end of the wire 500 away from oral tissue may be employed. The terminal ends of the archwire 500 may be formed by rounded bends in the distal terminal loops which are atraumatic.

In some embodiments, the terminal ends of the archwire 500 are capped with bulbs/bulbous ends 506, enclosing any sharp edges of the archwire 500. The bulbs 506 may be formed of a biocompatible material (e.g., non-toxic). The bulbs 506 may be stable so that they do not degrade over the course of the orthodontic treatment. The bulbs 506 may be formed of a polymeric material. The bulbs 506 may be formed of an adhesive, such as those used to bond brackets to teeth, which may be applied to the right and/or left ends of the archwire. In some embodiments, the bulbs 506 may be formed of a soft elastomeric material (e.g., PVS). The ends of the archwire 500 may be dip-coated with the biocompatible material. The biocompatible material may be injected or painted onto the left and right ends of the archwire 500. In some embodiments, the biocompatible material may be hardened on the ends of the archwire 500 by curing (e.g., heat cured or light cured). Curing may be accomplished through standard dental instruments, such as dental curing lights. In some embodiments, the biocompatible material may hardened by air-drying. The hardened bulb 506 may be shaped during and/or after hardening to form a generally rounded, atraumatic terminal end. For instance, the bulb 506 may be shaped by standard dental tools (e.g., drills, graspers, polishers, etc.) after it has hardened to alter the shape and/or surface of the bulb 506. In some embodiments, the bulb 506 may be prefabricated, for instance from a rubber silicone, and contain a channel for receiving an end of the archwire 500. The right and left ends of the archwire 500 can be inserted into the channel and secured therein. The archwire 500 may be secured by a friction fit and may be removable from the bulb 506 through application of sufficient force. In some embodiments, the end of the archwire 500 may be secured within the channel via a biocompatible adhesive. The bulbous cap 506 may be heated after attaching to the distal end of the archwire 500. Heating may shrink and/or bond the bulbous cap 506 to the archwire 500. The right and/or left ends may be bent to form atraumatic terminal ends 502 in addition to capping the wire end with bulbs 506.

In some embodiments, the right and left ends of the archwire 500 may be secured within the distal-most right and left brackets such that they do not protrude from the brackets. For example, the archwire 500 may contain a plurality of male fasteners where each male fastener secures the archwire to a bracket such that the archwire cannot slide laterally (in a mesial-distal direction) with respect to the bracket. The right and left terminal ends of the archwire 500 may be formed distally to the right and left most distal male fasteners within sufficient proximity to the male fasteners such that they do not extend out of bracket slots configured to receive the archwire. For instance, the archwire may terminate at one its distal ends at or near the point 508 indicated in FIG. 3, with respect to a distal bracket. The interaction of the male fasteners with the brackets prevents the archwire from sliding medially with respect to the brackets such that the archwire 500 remains securely engaged with the brackets. In some implementations, an orthodontic appliance may be configured with brackets specially configured as the distal-most brackets. The distal-most brackets may be configured with archwire slots that are configured to redirect and/or retain the terminal ends of the archwire. The distal-most brackets may have archwire slots that only open to the medial side of the bracket. The archwire slot may form a closed channel which prevents the distal end of the archwire from protruding from the bracket. For instance, the bracket 300 depicted in FIG. 3 may have a distal sidewall 510 which extends (not shown) to occupy the space within the distal archwire slot of the bracket such that the archwire slot does not extend through to the distal side of the bracket. In some embodiments the distal-most brackets may comprise an archwire slot having a medial opening and an opening directed in another direction (e.g., in an occlusal direction) to direct the terminal end of the archwire away from distally positioned oral tissue. The archwire 500 may be bent during fabrication or during introduction into the patient's mouth in order to conform to the modified slot of the distal-most brackets. The embodiments disclosed herein may be combined, such that the right end and left end of an archwire may be made atraumatic through the same or different means.

Disclosed herein are systems, devices, and methods for registering non-sliding archwires with orthodontic brackets. Orthodontic appliances that employ non-sliding mechanics may include an archwire with interproximal loops and/or male fasteners, as referenced elsewhere herein. Each interproximal loop may be positioned between two male fasteners. The interproximal loop may be configured to exert precise forces on two adjacent brackets to correct the positioning of the teeth to which the brackets are bonded. The surrounding male fasteners may be used to secure the archwire to those adjacent brackets in a non-sliding manner. Because the archwire may comprise a plurality of interproximal loops that are specifically configured with correction forces for different sets of teeth and because the archwire locks into a plurality of brackets in a non-sliding manner, the registration of the archwire with the brackets bonded to specific teeth is not trivial, especially compared to orthodontic appliances that rely on sliding mechanics. If the archwire is not properly registered to the respective orthodontic brackets (is misregistered), the proper orthodontic treatment may not be delivered. A system that allows quick and efficient registration may also save time and effort relative to correcting a misregistered orthodontic appliance during delivery to the patient.

In some embodiments, the archwire is registered to the brackets using a color registration system. The color registration system may include placing distinct color markings on the archwire and brackets to which the archwire is to be locked into. The archwire may be marked at or near a male fastener element or other locking element that corresponds to a given bracket. The color may match that of a marking on the corresponding bracket. In some embodiments, each fastener/bracket combination is assigned a distinct color (e.g., red, blue, green, yellow, orange, black, etc.). In some embodiments, the same color may be reused. For instance, adjacent brackets/fasteners may be marked with alternating colors or left and right sides of the mouth may use the same colors for corresponding left and right teeth. In some implementations, an orthodontic appliance is applied to the upper mandible and to the lower mandible. The upper and lower appliances may use distinct colors from each other or the same registration patterns. In some embodiments, color markings may be used not to register the archwire with particular brackets in an orthodontic appliance but to distinguish the upper and lower orthodontic appliances from each other or a color system may be used which performs both.

The color markings may be applied to the archwire and brackets according to any suitable method. The archwire and brackets may be painted with non-toxic dyes that are suitable for coloring metal materials. The archwire and brackets may be subject to chemical reactions, heating, anodization, or other physical reactions that can change the color of the metal without significantly altering the material properties of the archwire or bracket. The coloring of the orthodontic appliances may be relatively permanent or temporary. For instance, the coloring may wash away over time, especially under the presence of water (e.g., saliva). The archwire and brackets may be colored by attaching a colored marking element to the devices. For instance, a colored plastic tube may be configured to attach to the archwire. The tube may have a diameter substantially the same as that of the archwire. The tube may comprise a slit along its circumference that allows the tube to be slipped over the archwire and frictionally retained thereon. The tube may be easily removable from the archwire and can be removed after the orthodontic appliance has been properly registered. Other suitable configurations of color marking elements may be attached as well. Colored ribbons, strings, films, elastic bands, beads, etc. may be attached to the archwire and/or brackets. The color marking elements may be removed upon registration or may be left in place. The brackets may be marked with colored inserts that are configured to be received within (e.g., snap into) a portion of the geometry of the bracket. The inserts may insert into a portion of the bracket's archwire slot or a channel for receiving the male fastener/locking member and be removed just prior to the insertion of the archwire into each bracket. In some embodiments, the insert may be inserted into a residual or non-functional space within the bracket that is visible to the orthodontist and may need not be removed prior to insertion of the archwire. The insert or other color indicator on the bracket may be positioned such that is visible to the practitioner when working in the patient's mouth but not be readily visible to others in daily life. For instance, the color indicator may be relatively small, occluded by the patient's gums, positioned on a distal/mesial side of the bracket, and/or the brackets may be applied to lingual surfaces of the teeth. In such scenarios, it may be more amenable to leave the color indicator in place. The brackets may be designed with custom voids or spaces for receiving a colored insert. For example, the brackets may be fabricated with a bore configured to receive a custom colored peg. The peg may be configured to be inserted into the bore such that it forms a relatively smooth surface with the bracket when fully inserted. The inserts may be permanent or removable. In some embodiments, the inserts are inserted into the bracket after each bracket has been designated to a particular tooth. The inserts or other color indicator may, for example, be inserted after the brackets have been placed in an indirect bonding tray. In some implementations, the insert or other color indicator may be coupled to the brackets after the brackets are bonded to the teeth.

In some embodiments, a colored string, ribbon, or elastic band may be placed around the bracket or a portion of the bracket. The string, ribbon, or elastic band may be removed just prior to registering the archwire in each bracket. The string, ribbon, or elastic band may be cut after registering the archwire with the bracket. In some implementations, the string, ribbon, or elastic band may occupy the space of a tie configured to facilitate securing the archwire to the bracket and may be removed prior to placing the tie. The present disclosure encompasses combinations of the colored marking systems disclosed herein. In some embodiments, each bracket and corresponding fastener (or identifying portion of the archwire) will be color-coded. In some embodiments, only select brackets and corresponding fasteners will be color-coded. Registration of only a portion of the brackets with the archwire may be sufficient to improve the efficiency of registering the archwire with the brackets.

Disclosed herein are system, methods, and devices for fixing an archwire to a plurality of orthodontic brackets to form an orthodontic appliance that employs non-sliding mechanics between the archwire and the brackets. In some embodiments, the bracket and the archwire may be configured to be locked together using a crimpable stop. The archwire may comprise a stop member for engaging with a channel or slot of the bracket. The stop member may be a projection extending laterally from the archwire. The stop may be formed from one or more bends in the archwire to form a male fastener with a loop, such as a U-shaped loop, V-shaped loop, teardrop-shaped loop, etc., or may be formed as an integrated piece of material extending from the archwire. For example, the stop may be a post extending away from the archwire, a thin sheet extending from the archwire, a tube around the axis of the archwire, or a deformable portion of the archwire. The orthodontic bracket may comprise structures configured to engage the stop and fix it in place relative to the bracket, such that it cannot slide. For example, the orthodontic bracket may include a flange, one or more projections, a tube or partial tube, or other locking element which can physically engage the stop. The stop, locking element, or both may be plastically deformable such that the stop and locking element may be crimped together to secure the archwire to the bracket. The plastically deformable portions of the stop and/or locking element may comprise metal that is softer and more malleable than the remainder of the archwire/bracket and/or may be fabricated in sufficiently small dimensions (e.g., thin cross-sections) such that they are readily plastically deformable under the application of sufficient force. The archwire and bracket may be locked together in a non-sliding configuration by inserting the archwire into the slot such that the stop engages the locking member and by applying a physical force to crimp the stop to the locking member. The physical force may be applied via a standard orthodontic tool, such as orthodontic pliers. In some embodiments, more than one crimpable stop may be used to lock the archwire in place with a single bracket. In some embodiments, the stops can be used or modified for use with lower anterior brackets, such as those disclosed in U.S. patent application Ser. No. 15/490,278 to Tong et al., which is hereby incorporated by reference in its entirety.

For example, the crimpable stop may be a male fastener wherein the loop is crimped around a projection of the bracket, such as central projection 306 in FIG. 3. In another example, the archwire is inserted into a partial tube which is then crimped around the archwire or a flange from the bracket is bent around the archwire and crimped to secure the archwire in place. In another example, a post extending from the archwire may be inserted into a tube or partial tube which may be crimped around the post. In yet another example, the archwire comprises a thin flat sheet which may be deformed around a projection extending from the bracket. In some embodiments, the cross-section of the archwire may be plastically deformed where it is locked into place by the bracket, which may prevent the archwire from sliding relative to the bracket and/or from being readily removed from the bracket. In some embodiments, the crimping of the archwire to the bracket may form an orthodontic appliance which lacks some or all torque control around the axis of the archwire.

In some embodiments, the crimpable stop is a tube that is placed around the archwire. The tube may be slid over a distal end of the archwire. In some embodiments, the tube may have a slit along the length of the tube or the tube may only comprise a partial circumference, which may allow the tube to be placed around the archwire without sliding it on from the distal end. Unlike conventional orthodontic stops, the tube may be adapted to the non-sliding archwire and/or may be configured to lock into the bracket configured to receive the non-sliding archwire. For instance, the tube may be non-linear. The tube may be configured along its length or along portions of its length to resemble the shape of the interproximal loop, the male fastener, and/or the archwire slot. The tube may be configured to be received or partially received in the archwire slot. The tube may be crimped before or after the archwire is placed and/or locked into the orthodontic bracket.

Figure 6A:
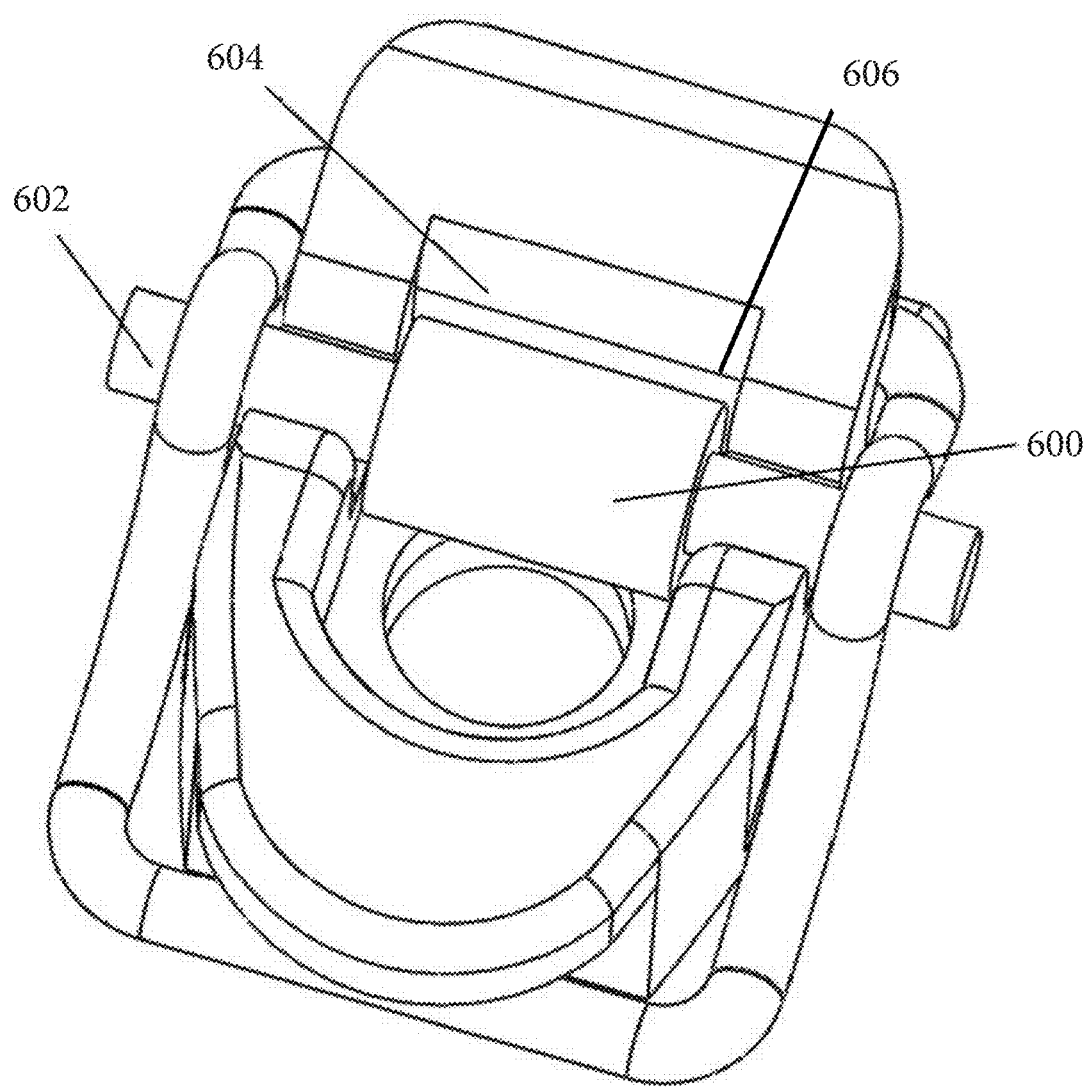
FIGS. 6A-6B schematically illustrate an example of a crimpable stop.

FIG. 6A illustrates an example of a crimpable stop 600. The crimpable stop 600 may be a cylindrical tube as described elsewhere herein. In some embodiments, the crimpable stop 600 may comprise a closed circumference and may be advanced over a distal end of an archwire 602. In some embodiments, the crimpable stop 600 may be partially closed (e.g., may comprise a slit along the length of the stop) and may be advanced (e.g., slid) over a distal end or placed directly on the archwire 602 (i.e. the archwire 602 may be inserted into the crimpable stop 600 through the slit). In some embodiments, the crimpable stop may be tubular but may comprise a non-cylindrical shape. For instance, the crimpable stop 600 may have a square, rectangular, triangular, or other polygonal shape, or the crimpable stop may have an oblong cross-section. The crimpable stop 600 may serve as or replace a male fastener element described elsewhere herein for fixing the archwire 602 to an orthodontic bracket 604 in a non-sliding manner. The archwire 602 may be substantially straight or linear along the portion configured to mate with the orthodontic bracket (e.g., between interproximal loops). The archwire slot of the bracket 604 may be substantially linear, extending in a mesial-distal direction. The bracket 604 may comprise a recess 606 configured to at least partially receive the crimpable stop 600 and to prevent or at least partially inhibit the crimpable stop 600 from sliding in a mesial-distal when received in the recess 606. The recess 606 may have a length configured to match or to be slightly larger than the length of the crimpable stop 600 as shown in FIG. 6. The recess 606 may be formed by sidewalls of the bracket 604. The recess 606 may be formed as part of the archwire slot. The recess 606 may have a depth extended beyond that of the archwire slot configured to at least partially receive the crimpable stop 606.

In some embodiments, the crimpable stop 600 may be applied to the archwire 602 prior to insertion of the archwire 602 into the orthodontic bracket 604. The crimpable stop may be crimped, as described elsewhere herein, after it is received within the recess 606. The recess 606 may be sized or otherwise configured to allow at least partial insertion of a crimping tool (e.g., pliers, crimpers, graspers, etc.). Crimping the crimpable stop 600 to the archwire 602 may fixedly secure the stop 600 and archwire 602 together such that the archwire cannot be axially advanced (e.g., slid) through the crimpable stop 600, even under force from interproximal loops. In some embodiments, the crimpable stop 600 may be applied to the archwire 602 after the archwire 602 is inserted into the orthodontic bracket 604. In some embodiments, the crimpable stop 600 may be applied and crimped before the archwire 602 is inserted into the orthodontic bracket 604. If multiple crimpable stops 600 are used, the application and crimping sequence may be the same or different for each stop 600. The crimpable nature of the stop 600 may allow last minute fine-tuning of the fixed position of the archwire within the bracket 604. This embodiment of crimpable stop may be particularly suitable for archwires in which torqueing forces are not needed or not desired to be exerted onto the teeth. In some embodiments, the crimpable stops may be colored. The crimpable stops may serve as the color-coded registration indicators described elsewhere herein for registering the archwire 602 (e.g., adjacent interproximal loops) with the proper orthodontic bracket 605. In some embodiments, the stop may not be crimpable but may be fixed to the archwire 602 in another way, such as molding, such that the stop appears similar to wire insulation.

Figure 6B:
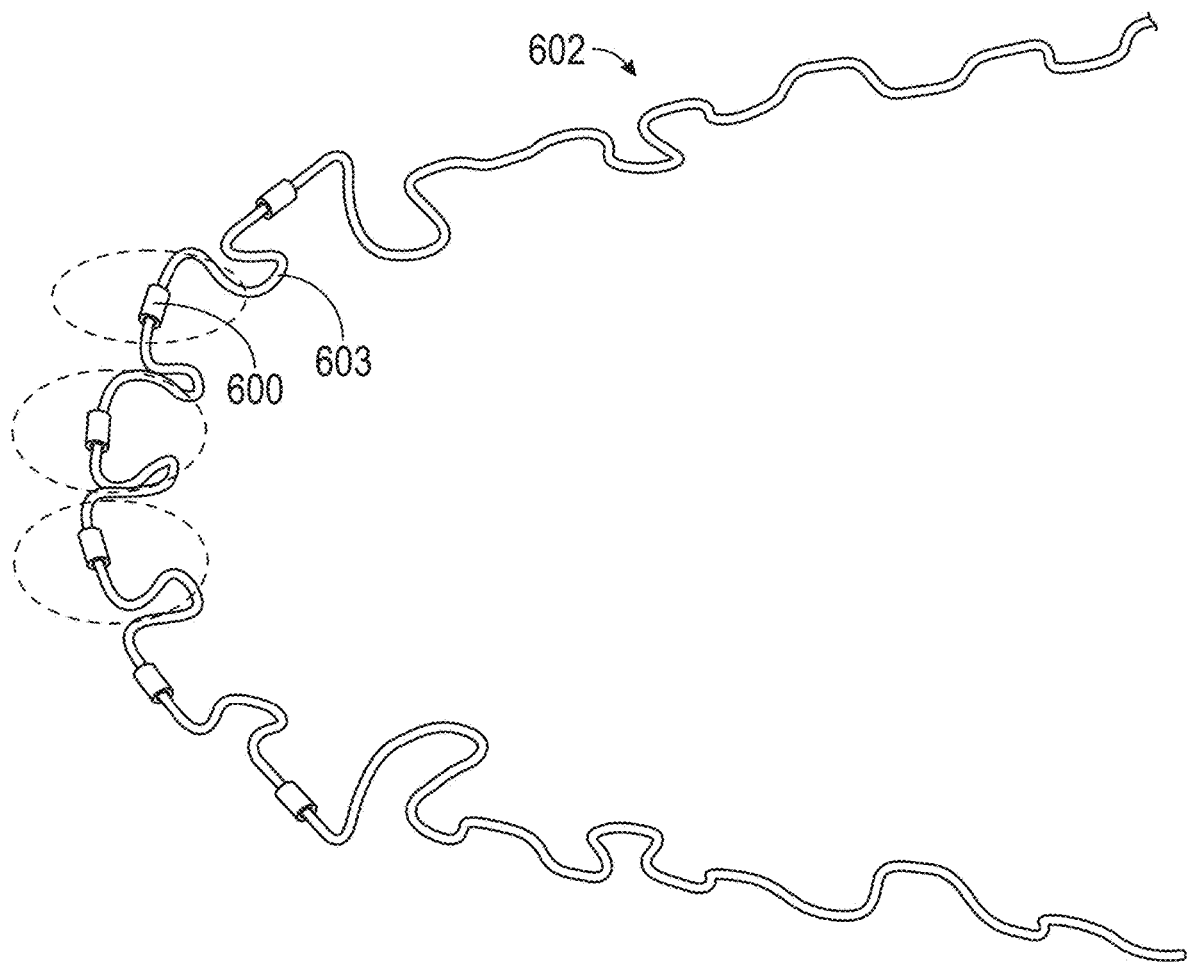

FIG. 6B illustrates an embodiment of an archwire 602 comprising interproximal loops 603 and several tubular crimpable stops 600 (indicated by enclosing circles) positioned between some of the interproximal loops to fixedly secure the archwire 602 to brackets on the lower anterior teeth.

Various other modifications, adaptations, and alternative designs are of course possible in light of the above teachings. For example, features disclosed in U.S. Pub. No. 2014/0120491 A1 to Khoshnevis et al. can be utilized or modified or use with embodiments as disclosed herein. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "tying a tie onto an orthodontic bracket" includes "instructing the tying of a tie onto an orthodontic bracket."

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. An indirect bonding (IDB) tray for transferring an orthodontic bracket, the IDB tray comprising:
    delineations demarcating where to section the IDB tray into separate pieces, the delineations positioned to avoid sectioning the IDB tray through a portion corresponding to a tooth;
    at least one slot configured to hold an orthodontic bracket;
    one or more handles projecting from an occlusal side of the IDB tray, wherein each of the one or more handles is buccally offset from a lingual-most surface of the IDB tray disposed directly lingual of an occlusal-most surface of the handle; and
    indicia indicating treatment information, the treatment information configured to register a section of the IDB tray to a specific tooth and register the IDB tray to an upper or lower dental arch.

2. The IDB tray of claim 1, wherein the one or more handles comprise a thickness in a lingual-buccal direction that is smaller than an overall thickness of the IDB tray in the lingual-buccal direction.

3. The IDB tray of claim 2, wherein the one or more handles are offset in a lingual direction from a buccal-most surface of the IDB tray.

4. The IDB tray of claim 1, wherein the one or more handles comprise a length configured to span two or more teeth.

5. The IDB tray of claim 4, wherein the one or more handles comprise a generally rectangular outer cross-section.

6. The IDB tray of claim 4, wherein the one or more handles are integral.

7. The IDB tray of claim 4, wherein the separate pieces are configured to be disposed on different portions of a dental arch.

8. The IDB tray of claim 7, wherein the indicia comprises a color that registers to a particular anatomical location per a color-code.

9. The IDB tray of claim 8, wherein the color is impregnated into the tray.

10. The IDB tray of claim 8, wherein the indicia is printed.

11. The IDB tray of claim 8, wherein the treatment information comprises tooth identifiers.

12. The IDB tray of claim 11, wherein the tooth identifiers are represented by numbers aligned approximately at corresponding positions of identified teeth.

13. The IDB tray of claim 12, wherein the treatment information comprises symbols indicating medial and occlusal sides of teeth corresponding to the IDB tray.

14. An indirect bonding (IDB) tray for transferring an orthodontic bracket, the IDB tray comprising:
    delineations demarcating where to section the IDB tray, the delineations positioned to avoid sectioning the IDB tray through a portion corresponding to a tooth;
    at least one slot configured to hold an orthodontic bracket;
    a handle projecting occlusally from the IDB tray, wherein the handle is offset in a buccal direction from a lingual-most surface of the IDB tray aligned with an occlusal-most surface of the handle in a mesial-distal direction; and
    indicia indicating treatment information, the treatment information configured to register a section of the IDB tray to a specific tooth.

15. The IDB tray of claim 14, wherein the handle comprises a length configured to span two or more teeth.

16. The IDB tray of claim 15, wherein the delineations demarcate where to section the IDB tray into separate pieces that are configured to be disposed on different portions of a dental arch.

17. The IDB tray of claim 16, wherein the separate pieces comprise three pieces.

18. The IDB tray of claim 17, wherein the handle is integral with the IDB tray.

19. An indirect bonding (IDB) tray for transferring an orthodontic bracket, the IDB tray comprising:
    delineations demarcating where to section the IDB tray, the delineations positioned to avoid sectioning the IDB tray through a portion corresponding to a tooth;
    at least one slot configured to hold an orthodontic bracket;
    a plurality of integral handles projecting occlusally from the IDB tray, wherein each of the plurality of integral handles is offset in a buccal direction from a lingual-most surface of the IDB tray disposed directly lingual of an occlusal-most surface of the handle; and
    indicia indicating treatment information, the treatment information configured to register the IDB tray to an upper or lower dental arch.

* * * * *